(12) United States Patent
Kimura et al.

(10) Patent No.: US 7,548,693 B2
(45) Date of Patent: Jun. 16, 2009

(54) RELAY TRANSMISSION APPARATUS

(75) Inventors: Gaku Kimura, Kawasaki (JP); Koji Takeguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 397 days.

(21) Appl. No.: 10/900,763

(22) Filed: Jul. 28, 2004

(65) Prior Publication Data
US 2005/0213970 A1   Sep. 29, 2005

(30) Foreign Application Priority Data
Mar. 29, 2004  (JP) .............................. 2004-096602

(51) Int. Cl.
*H04J 14/00* (2006.01)
(52) U.S. Cl. ................ 398/59; 398/45; 398/5
(58) Field of Classification Search ................ 398/145, 398/173, 5, 45, 57, 59
See application file for complete search history.

(56) References Cited

U.S. PATENT DOCUMENTS

| | | | | |
|---|---|---|---|---|
| 5,317,198 | A * | 5/1994 | Husbands | 307/116 |
| 5,319,488 | A * | 6/1994 | Ishiwatari | 398/115 |
| 5,903,371 | A * | 5/1999 | Arecco et al. | 398/4 |
| 6,137,603 | A | 10/2000 | Henmi | |
| 6,201,788 | B1 * | 3/2001 | Ishiwatari | 370/228 |
| 6,256,125 | B1 | 7/2001 | Uehara | |
| 6,542,268 | B1 * | 4/2003 | Rotolo et al. | 398/68 |
| 6,639,703 | B1 * | 10/2003 | Egnell | 398/175 |
| 6,684,005 | B1 | 1/2004 | Egnell et al. | |
| 7,072,584 | B1 * | 7/2006 | Lichtman et al. | 398/59 |
| 7,302,176 | B2 * | 11/2007 | Sakano et al. | 398/5 |
| 2002/0003639 | A1 * | 1/2002 | Arecco et al. | 359/119 |
| 2002/0114044 | A1 * | 8/2002 | Chiou et al. | 359/172 |
| 2002/0131696 | A1 * | 9/2002 | Yokoyama et al. | 385/27 |
| 2002/0171890 | A1 * | 11/2002 | Lin et al. | 359/124 |
| 2002/0176432 | A1 * | 11/2002 | Courtney et al. | 370/415 |
| 2002/0186430 | A1 * | 12/2002 | Halgren et al. | 359/124 |
| 2003/0210909 | A1 * | 11/2003 | Rowan et al. | 398/43 |
| 2004/0190899 | A1 * | 9/2004 | Torii et al. | 398/33 |

FOREIGN PATENT DOCUMENTS

| | | |
|---|---|---|
| JP | 59-21143 | 2/1984 |
| JP | 62-112429 | 5/1987 |
| JP | 8-191478 | 7/1996 |
| JP | 9-224001 | 8/1997 |
| JP | 10-126350 | 5/1998 |
| JP | 10-271153 | 10/1998 |

(Continued)

OTHER PUBLICATIONS

Notification of Reasons for Rejection mailed Jan. 13, 2009, from the corresponding Japanese Application.

*Primary Examiner*—Quan-Zhen Wang
(74) *Attorney, Agent, or Firm*—Katten Muchin Rosenman LLP

(57) ABSTRACT

A relay transmission apparatus in which the effectiveness of a protecting function is improved by suppressing variation of an OSNR value of a signal regardless of the distance that the signal is transmitted. The relay transmission apparatus is comprised of a first regenerative relay unit, a second regenerative relay unit, and a protection process unit for extracting a signal component from each of the first and second regenerative relay units and selectively outputting either of the extracted signal components as a drop signal.

10 Claims, 16 Drawing Sheets

FOREIGN PATENT DOCUMENTS

| | | |
|---|---|---|
| JP | 10-303863 | 11/1998 |
| JP | 2000-89263 | 3/2000 |
| JP | 2003-510961 | 3/2003 |
| JP | 2003-258730 | 9/2003 |
| WO | 03/104849 | 12/2003 |

* cited by examiner

FIG. 8A 75, 76(11)

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| 0 | 0 | 0 | 0 | 0 |

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| SIGNAL DISTRIBUTING STATION 11 | 1 | 0 | 0 | 0 |

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| SIGNAL DISTRIBUTING STATION 11 | 1 | 1 | 0 | 0 |

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| SIGNAL DISTRIBUTING STATION 11 | 1 | 1 | 1 | 0 |

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| SIGNAL DISTRIBUTING STATION 11 | 1 | 1 | 1 | 0 |

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| SIGNAL DISTRIBUTING STATION 11 | 1 | 1 | 1 | 1 |

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| SIGNAL DISTRIBUTING STATION 11 | 1 | 0 | 0 | 0 |

FIG. 10A 75, 76(11)

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| 0 | 0 | 0 | 0 | 0 |

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| SIGNAL DISTRIBUTING STATION 11 | 1 | 0 | 0 | 0 |

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| SIGNAL DISTRIBUTING STATION 11 | 0 | 0 | 0 | 0 |

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| SIGNAL DISTRIBUTING STATION 11 | 1 | 0 | 1 | 0 |

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| SIGNAL DISTRIBUTING STATION 11 | 1 | 1 | 1 | 0 |

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| SIGNAL DISTRIBUTING STATION 11 | 1 | 0 | 0 | 1 |

| Head End | SIGNAL DISTRIBUTING STATION 11 | SIGNAL RELAYING STATION 12B | SIGNAL RELAYING STATION 13B | SIGNAL RELAYING STATION 14B |
|---|---|---|---|---|
| SIGNAL DISTRIBUTING STATION 11 | 1 | 0 | 0 | 0 |

RELAY TRANSMISSION APPARATUS

BACKGROUND OF THE INVENTION

1) Field of the Invention

The present invention relates to a relay transmission apparatus in a network having a function of selecting either of signals transmitted through two different routes as a received signal such as an OUPSR (Optical Unidirectional Path Switched Ring) network.

2) Description of the Related Art

In the communication industry, enterprises such as MSOs (Multi Service Operators) recently have increasing demand for distribution of a large volume of data such as motion picture data as that seen in a cable television broadcast. As a basic network adapted for transmission of such data, an increasing number of enterprises are constructing a wavelength division multiplex (WDM) network, which requires a smaller number of optical fibers and therefore allows a reduction in running cost when compared to the conventional TDM (Time Division Multiplex) network.

When a large volume of data are distributed in the mode of broadcasting mentioned above, a receiving station is required to have not only a drop function for distributing signals from a signal distributing station to the network to which the own receiving station belongs but also a continue function for relay-transmitting the signals from the signal distributing station to another receiving station in the neighborhood of the same (the functions are hereinafter collectively referred to as "Drop and Continue").

The introduction of the OUPSR method into such a network distributing a large volume of data is being studied in an intention to ensure distribution of a large volume of data and to improve reliability of communication. In order to use such a drop and continue function in a WDM network while achieving OUPSR network topology and redundancy of signals, for example, the network may be configured as shown in FIG. 16.

Here, in a network 100 shown in FIG. 16, a signal distributing station 101 as a head end station and three receiving stations 102 to 104 as drop stations are connected to each other through a bidirectional transmission route 105 to form a ring network which has clockwise (RR) and counterclockwise (LR) as the signal transmitting directions.

Further, the signal distributing station 101 is composed of a data generation unit 101a for generating (a large volume of) data to be distributed to the receiving stations 102 to 104 as a wide-band optical signal, a transponder unit 101b for performing inter-transformation of optical wavelengths between the wide-band optical signal and a narrow-band optical signal which is to be wavelength-multiplexed, and a WDM unit 101c for multiplexing the wavelength of the narrow-band optical signal from the transponder unit 101b to transmit it in a clockwise (RR) transmission route 105 and a counterclockwise (LR) transmission route 105. The WDM unit 101c transmits two data sets from the transponder unit 101b using the same wavelength channel along with a signal in another wavelength channel as wavelength multiplex optical signals.

Further, the receiving stations 102 to 104 have WDM units 102a to 104a, respectively, and also is composed of switches 102b to 104b and data receiving units 106 to 108, respectively. The WDM units 102a to 104a receive the input of wavelength multiplex optical signals from the clockwise (RR) and counterclockwise (LR) transmission routes 105 and perform a required drop-and-continue process for an optical signal in the wavelength channel for distribution of a large volume of data as described above. The switches 102b to 104b selectively output either of the signals from the transmission routes 105 in two directions (RR and LR) dropped at the WDM units 102a to 104a to respective data receiving units 106 to 108 as a received signal.

Let us now discuss about the large volume of data to be distributed from the signal distribution station 101 to each of the receiving stations 102 to 104 in the OUPSR network 100 having such a configuration. Then, the signals (the large volume of data) transmitted in the transmission routes 105 in two directions, i.e., clockwise (RR) and counterclockwise (LR) directions, are dropped and continued at each of the receiving stations 102 to 104.

Specifically, in the route in which a signal is transmitted from the signal distributing station 101 as the starting point to the receiving station 102, the receiving station 103, and the receiving station 104 in the order listed (clockwise route), the signal is dropped and continued at the receiving stations 102 and 103 serving as relay stations. In the route in which a signal is transmitted from the signal distributing station 101 as the starting point to the receiving station 104, the receiving station 103, and the receiving station 102 in the order listed (counterclockwise route), the signal is dropped and continued at the receiving stations 104 and 103 serving as relay stations.

At the respective receiving stations 102 to 104, the WDM units 102a to 104a selectively output (called as being protection function) either of the signals dropped from the routes in two directions, i.e., clockwise and counterclockwise directions as described above depending on switching at the switch units 102b to 104b, which provides redundancy in signal transmission and allows the drop signal having better quality to be output.

For example, the switch unit 103b of the receiving station 103 selectively outputs either of a signal which has followed the clockwise route via the receiving station 102 or a signal which has followed the counterclockwise route via the receiving station 104 to a data receiving unit 107. As thus described, the drop-and-continue function can be used in an OUPSR configuration with redundancy added to the function in order to improve reliability of communication.

Patent Documents 1 and 2 listed below disclose techniques related to this invention.

Patent Document 1 discloses an optical circuit that is provided at a node for distributing an optical signal in a network having a multicast function, the circuit outputting a part of the optical intensity of signal light which has been branched to a drop port and outputting the remaining part of the optical intensity of the signal light to a main output port after adjusting it to a required level.

Patent Document 2 discloses a technique for a light insertion/branching ring system of the wavelength multiplex optical transmission system, in which a wavelength component to be regeneratively relayed among main signal wavelength components separated by a wavelength separating unit are regeneratively relayed according to a bit rate using a bit-rate-selection type regenerative relay device. However, the document discloses no technique for switching drop signals in a network having an OUPSR configuration.

[Patent Document 1] Japanese Patent Laid-Open Publication No. JP-A-2000-89263

[Patent Document 2] Japanese Patent Laid-Open Publication No. JP-A-10-303863

However, at each receiving station of a network like the OUPSR network 100 shown in FIG. 16 having the selection function of any of a plurality of signals transmitted through different routes as a received signal, variation of an OSNR (Optical Signal Noise Ratio) occurs even between identical signals because they are transmitted different distances depending on the routes they follow. Specifically, a signal must normally be amplified many times to be relayed a long transmission distance, which results in deterioration of the ONSR of the signal. A problem therefore arises in that the effectiveness of a protection function provided by OUPSR cannot be improved.

For example, when a drop signal received at the receiving station 102 described above directly received from the signal distributing station 101 through the clockwise route and a drop signal received through the counterclockwise route via the receiving stations 104 and 103 are compared, it is considered that the drop signal following the counterclockwise route is more likely to have a degraded OSNR as described above because of the length of the transmission route. It is therefore impossible to improve the effectiveness of redundant transmission of signals in such an OUPSR network.

SUMMARY OF THE INVENTION

The present invention has been conceived taking such a problem into consideration, and it is an object of the present invention to provide a relay transmission apparatus capable of preventing variation of the OSNR value of a signal depending on the transmission distance of the signal to improve the effectiveness of a protection function in a network having a function of selecting either of signals transmitted through two different routes as a received signal.

For this purpose, a relay transmission apparatus according to the present invention is a relay transmission apparatus having a function of selecting either of signals which have been optically transmitted through transmission routes following two different routes as a received signal, characterized in that it is composed of a first regenerative relay unit for regeneratively relaying an optical signal input from a transmission route in a first transmitting direction, a second regenerative relay unit for regeneratively relaying an optical signal input from a transmission route in a second transmitting direction, and a protection process unit for extracting a signal component from each of the first and second regenerative relay units and selectively outputting either of the extracted signal components as a drop signal.

Preferably, in the above described relay transmission apparatus, each of the first and second regenerative relay units has a dropped optical signal generation part for generating an optical signal to be dropped based on the optical signal from the respective one of the transmission routes in the first and second transmitting directions, a returning and branching part for branching and returning part of the optical signal to be dropped from the dropped optical signal generation part, and a regeneratively relayed optical signal generation part for generating the optical signal to be regeneratively relayed based on the optical signal to be dropped returned by the returning and branching part. The protection process unit preferably has first and second optical signal component extraction parts for extracting optical signals to be dropped from the dropped optical signal generation parts of the first and second regenerative relay units, respectively, and an optical signal selection switch for selecting either of the optical signal components extracted by the first and second optical signal component extraction parts as a drop signal.

More preferably, each of the dropped optical signal generation parts of the first and second regenerative relay units has a first optical-to-electrical conversion portion for converting the optical signal from the respective one of the transmission routes in the first and second transmitting directions into an electrical signal, a dropped electrical signal generation portion for generating an electrical signal to be dropped from the electrical signal obtained by the conversion at the first optical-to-electrical conversion portion, and a first electrical-to-optical conversion portion for converting the electrical signal to be dropped generated by the dropped electrical signal generating portion into the optical signal to be dropped. The regeneratively relayed optical signal generation parts of the first and second regenerative relay units preferably have a second optical-to-electrical conversion portion for converting the optical signal from the returning and branching part into an electrical signal, a regeneratively relayed electrical signal generation portion for generating the electrical signal to be regeneratively relayed from the electrical signal obtained by the conversion at the second optical-to-electrical conversion portion, and a second electrical-to-optical conversion portion for converting the electrical signal to be regeneratively relayed into the optical signal to be regeneratively relayed.

The returning and branching part of the first regenerative relay unit may be commonly used by the first optical signal component extraction part of the protection process unit as a first optical signal extraction part, and the returning and branching part of the second regenerative relay unit may be commonly used by the second optical signal component extraction part of the protection process unit.

In the above-described relay transmission apparatus, preferably, each of the first and second regenerative relay units may have an optical-to-electrical conversion part for converting the optical signal from the respective one of the transmission routes in the first and second transmitting directions into an electrical signal, an electrical stage processing part for generating an electrical signal to be dropped and the electrical signal to be regeneratively relayed from the electrical signal obtained by the conversion at the optical-to-electrical conversion part, and a first electrical-to-optical conversion part for converting the electrical signal to be regeneratively relayed from the electrical stage processing part into the optical signal to be regeneratively relayed. The protection process unit may have an electrical signal selection switch to which the electrical signals to be dropped are input from the electrical stage processing parts of the first and second regenerative relay units, respectively, and which selectively outputs either of the input electrical signals to be dropped as a drop signal and a second electrical-to-optical conversion part for converting the electrical signal output by the electrical signal selection switch into an optical signal to be dropped.

Further, the above described relay transmission apparatus is preferably composed of a control unit for controlling the protection process unit such that either of the signal components from the first and second regenerative relay units is selectively output as a drop signal depending on the degree of deterioration of the optical signal input from the transmission route in the first or second transmitting direction.

Further, a relay transmission apparatus according to the present invention is a relay transmission apparatus having a function of selecting either of signals which have been optically transmitted through transmission routes following two different routes as a received signal, characterized in that it is composed of a protection process unit for selectively outputting either an optical signal input from a transmission route in a first transmitting direction or an optical signal input from a transmission route in a second transmitting direction, an optical signal generation unit for generating an optical signal to be regeneratively relayed, which has been subjected to a regeneration process, along with an optical signal to be dropped based on the optical signal output by the protection process unit, and a branching unit for branching the optical signal to be regeneratively relayed generated by the regeneratively relayed optical signal generation unit in two components to be transmitted to the transmission routes in the first and second transmitting directions, respectively.

In this case, the optical signal generation unit has a first optical-to-electrical conversion part for converting the optical signal from the protection process unit into an electrical signal, a dropped electrical signal generation part for generating the electrical signal to be dropped from the electrical signal from the first optical-to-electrical conversion part, a first electrical-to-optical conversion part for converting the electrical signal to be dropped generated by the dropped electrical signal generation part into the optical signal to be dropped, a returning and branching part for branching and returning a part of the optical signal to be dropped from the first electrical-to-optical conversion part, a second optical-to-electrical conversion part for converting the optical signal to be dropped returned by the returning and branching part into an electrical signal, a regeneratively relayed electrical signal generation part for generating the electrical signal to be regeneratively relayed from the electrical signal from the second optical-to-electrical conversion part, and a second electrical-to-optical conversion part for converting the electrical signal to be regeneratively relayed into the optical signal to be regeneratively relayed.

Alternatively, the optical signal generation unit has a first optical-to-electrical conversion part for converting the optical signal from the protection process unit into an electrical signal, a dropped and regeneratively relayed electrical signal generation part for generating the electrical signal to be dropped and the electrical signal to be regeneratively relayed from the electrical signal from the first optical-to-electrical conversion part, a first electrical-to-optical conversion part for converting the electrical signal to be dropped into the optical signal to be dropped, and a second electrical-to-optical conversion part for converting the electrical signal to be regeneratively relayed into the optical signal to be regeneratively relayed.

Further, the relay transmission apparatus may be comprised of a first table for managing information on the route of the optical signal input from the transmission route in the first transmitting direction, a second table for managing information on the route of the optical signal input from the transmission route in the second transmitting direction, and a control unit for controlling the protection process unit such that either of the optical signal input from the transmission route in the first transmitting direction and the optical signal input from the transmission route in the second transmitting direction is selectively output depending on the route information managed by the first and second tables and the degree of deterioration of the optical signal input from the transmission route in the first or second transmitting direction.

As thus described, according to the present invention, either of signals optically transmitted through transmission routes following two routes can be dropped using the protection process while regenerating the signals optically transmitted through the transmission route following two routes by the first and second regenerative relay units, which is advantageous in that the effectiveness of the protection function can be improved by suppressing variation of an OSNR value of a signal attributable to the distance that the signal is transmitted.

According to the present invention, a drop signal and an optical signal to be regeneratively relayed can be generated by selecting either of signals which has been optically transmitted through transmission routes following two routes by the protection process unit and the optical signal generation unit. This provides the same advantage as that described above. In addition, there is an advantage in that a network of a large scale can be constructed because a signal can be regeneratively relayed by each relay transmission apparatus on a network to allow the signal to be transmitted through a greater ring length and in that the manufacturing cost of such an apparatus can be significantly reduced through a reduction in the number of components of the apparatus such as components for photo-electrical conversion because the apparatus requires only a single relay transmission unit.

BRIEF DESCRIPTION OF THE DRAWINGS

FIGS. 8A to 8G are views for explaining operations of the OUPSR network to which the relay transmission apparatus according to the second embodiment is applied;

FIGS. 10A to 10G are views for explaining operations of the OUPSR network to which the relay transmission apparatus according to the second embodiment is applied;

DESCRIPTION OF THE PREFERRED EMBODIMENTS

Embodiments of the invention will now be described with reference to the drawings below.

[A] Description of the First Embodiment

Figure 1:
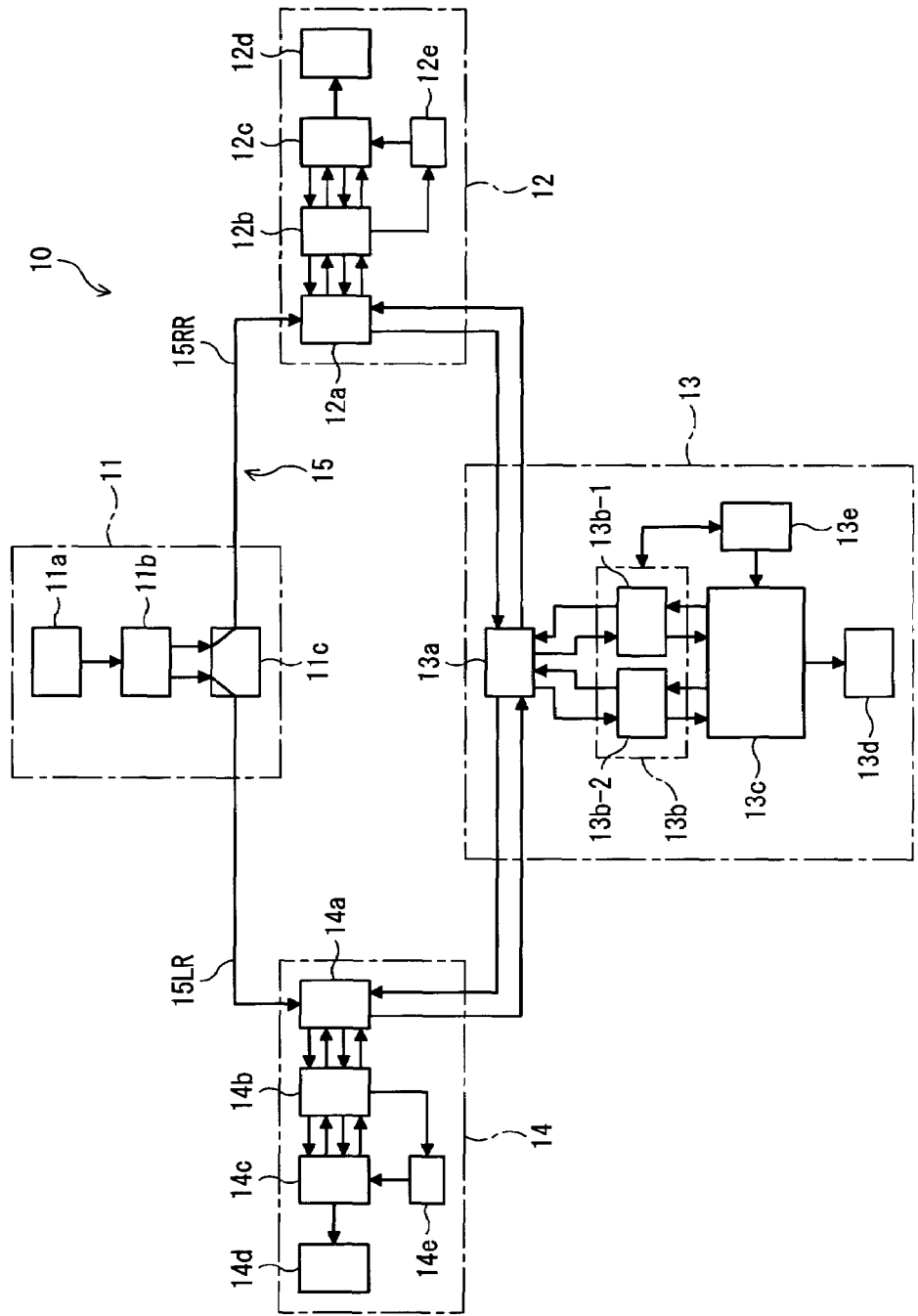
FIG. 1 is a view showing an OUPSR network to which relay transmission apparatus according to a first embodiment of the present invention is applied.

FIG. 1 is a view showing an OUPSR network to which a relay transmission apparatus according to a first embodiment of the invention is applied. An OUPSR network 10 is a wavelength multiplex transmission network capable of transmitting signals in a plurality of wavelength channels on a multiplex basis. In particular, the discussion of the OUPSR network 10 shown in FIG. 1 will be focused on a wavelength channel for which a station 11 operates as a signal distributing station and stations 12 to 14 operate as receiving and relaying stations.

Specifically, in the OUPSR network 10 shown in FIG. 1, a signal distributing station 11 as a head end station and three relaying stations 12 to 14 as drop stations are connected to each other through a bidirectional transmission route 15 to constitute a ring network which has clockwise (RR) and counterclockwise (LR) signal transmitting directions in the figure.

Figure 16:
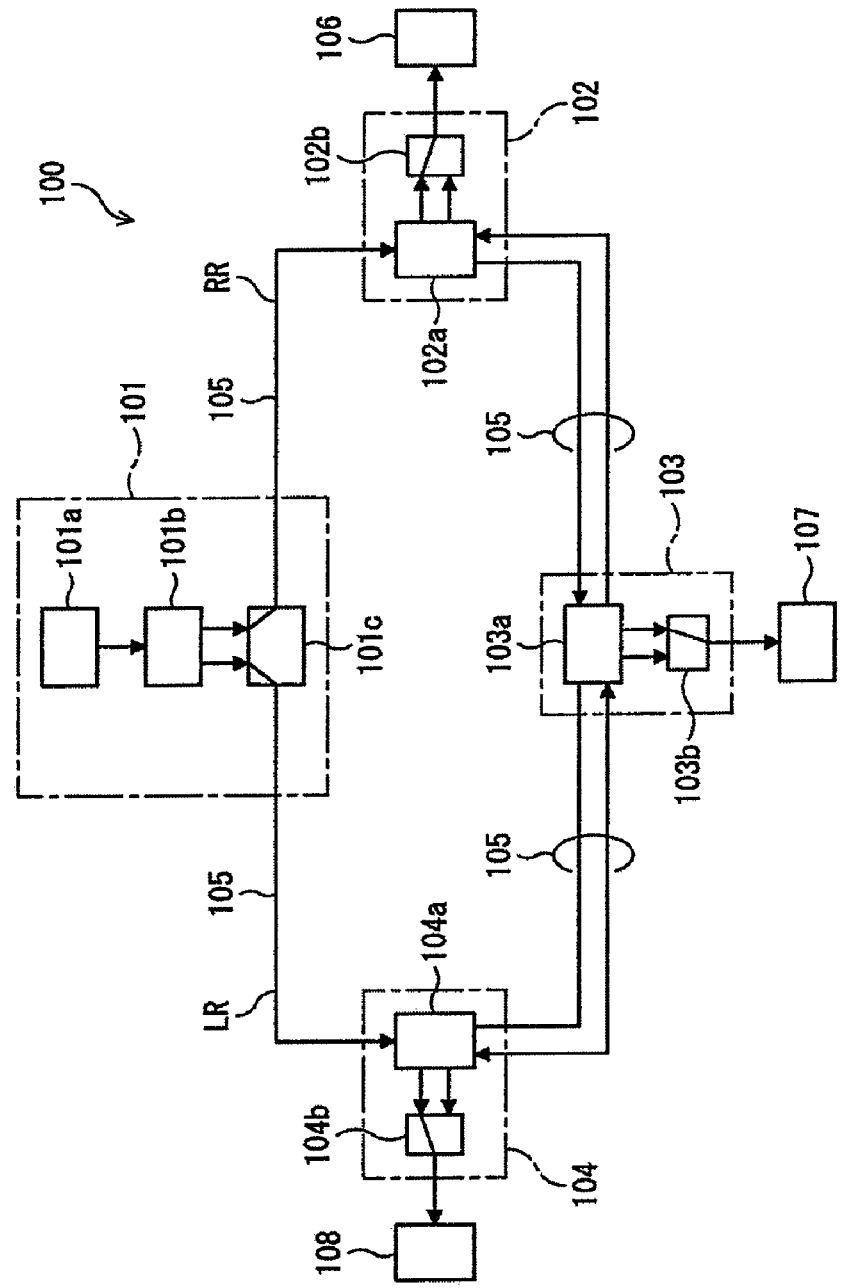
FIG. 16 is a block diagram showing a conventional example.

The signal distributing station 11 is comprised of data generation unit 11a, a transponder unit 11b, and a WDM unit 11c, which are basically the same as those (with reference numerals 101a to 101c) in the signal distributing station 101 shown in FIG. 16, but the receiving and relaying stations 12 to 14 have a configuration that is characteristic of a relay transmission apparatus according to the present invention of this application unlike the above-described receiving stations 102 to 104 shown in FIG. 16.

Any of the receiving and relaying stations 12 to 14 is different from those (with reference numerals 102 to 104) shown in FIG. 16 in that it constitutes a relay transmission apparatus which regeneratively relays about signals from the signal distributing station 11 through a clockwise (RR) or counterclockwise (LR) transmission route 15.

Figure 2:
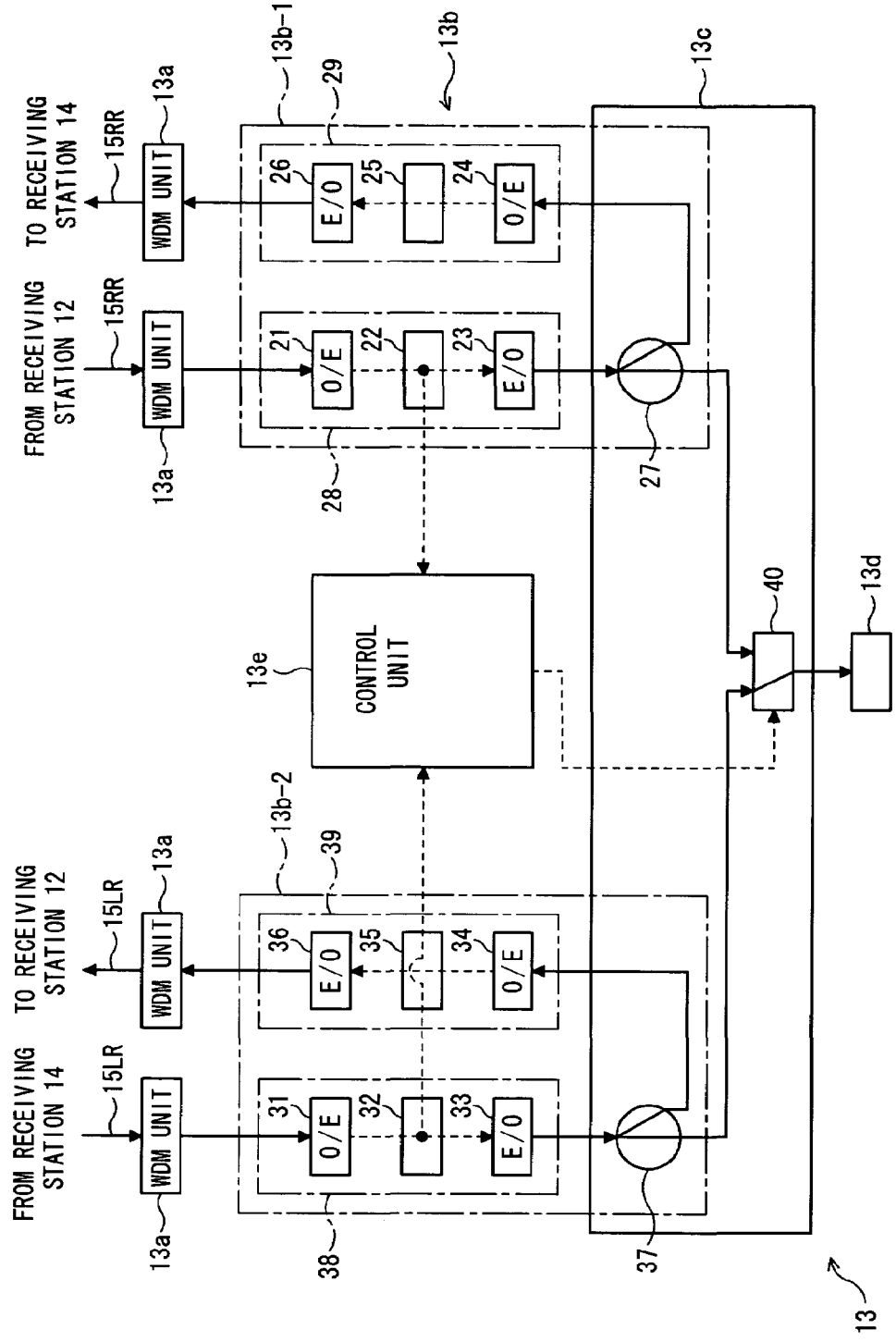
FIG. 2 is a block diagram of the relay transmission apparatus according to the first embodiment of the present invention.

FIG. 2 is a block diagram showing a configuration of the above described receiving and relaying stations 12 to 14 in detail by bringing the receiving and relaying station 13 into focus. In the figures, an arrow in a solid line in the figure represents the propagating direction of an optical signal, and an arrow in a dotted line represents the propagating direction of an electrical signal.

Specifically, the receiving and relaying stations 12 to 14 has respective WDM units 12a to 14a which are different in function from those (with reference numbers 102a to 104a) shown in FIG. 16, respective transponder units 12a to 14a, protection process units 12c to 14c, and control units 12e to 14e which are features characteristic of the invention of this application, and data receiving units 12d to 14d which are similar to those in FIG. 16.

The WDM units 12a to 14a receive the input of wavelength multiplex optical signals from a clockwise transmission route 15RR and a counterclockwise transmission route 15LR, perform wavelength separation on the wavelength multiplex signals to convert them into optical signals having respective wavelength components (wavelength-separated optical signals), and output (drop) an optical signal in a wavelength channel for distributing a large volume of data from the above-described signal distributing station 11 to the respective transponder units 12b to 14b according to the invention.

The WDM units 12a to 14a receive the input of an optical signal to be relayed through a transmission route 15 which is input using a wavelength channel for forming a wavelength multiplex signal after being regenerated by the respective transponder units 12b to 14b to be described later, perform a wavelength multiplexing process along with a signal in another wavelength channel (perform a continue process), and transmit it to the transmission route 15.

Each of the transponder units 12b to 14b of the receiving and relaying stations 12 to 14 functions as a first regenerative relay unit (see reference numeral 13b-1 in the receiving and relaying station 13) which drops and regeneratively relays an optical signal input from the transmission route 15 that is clockwise (RR) to be a first transmitting direction and functions as a second regenerative relay unit (see reference numeral 13b-2 in the receiving and relaying station 13) which drops and regeneratively relays an optical signal input from the transmission route 15 that is counterclockwise (LR) to be a second transmitting direction.

Referring to FIG. 1, while the transponder unit 12b of the receiving and relaying station 12 may have the same function as that of the above-described first regenerative relay unit 13b-1, since the receiving and relaying station 12 is a receiving and relaying station at the end of the counterclockwise transmission route 15LR, it is not required to have the same regenerative relay function as that of the above-described second regenerative relay unit 13b-2.

While the transponder unit 14b of the receiving and relaying station 14 may have the same function as that of the above described second regenerative relay unit 13b-2, since the receiving and relaying station 14 is a receiving and relaying station at the end of the clockwise transmission route 15RR, it is not required to have the same regenerative relay function as that of the above described first regenerative relay unit 13b-1.

The protection process units 12c to 14c selectively output either of signals from the transmission route 15 in two directions (RR and LR) that are dropped at the respective WDM units 12a to 14a according to an OUPSR protection function to the respective data receiving units 12d to 14d as a received signal. Referring to the receiving and relaying station 13 in this connection, the protection process unit 13c extracts signal components from each of the first and second regenerative relay units 13b-1 and 13b-2 and selectively outputs either of the extracted signal components as a drop signal.

Referring to the configuration of the receiving and relaying station 13, the first regenerative relay unit 13b-1 is composed of a dropped optical signal generation part 28 for generating an optical signal to be dropped based on an optical signal from the transmission route 15RR that is clockwise to be the first transmitting direction, a coupler 27 serving as a returning and branching part for branching and returning a part of the optical signal to be dropped from the dropped optical signal generation part 28 to relay the same part, and a regeneratively relayed optical signal generation part 29 for generating an optical signal to be regeneratively relayed based on the optical signal to be dropped returned by the returning and branching part 27.

The second regenerative relay unit 13b-2 is composed of a dropped optical signal generation part 38 for generating an optical signal to be dropped based on an optical signal from the transmission route 15LR that is clockwise to be the second transmitting direction, a coupler 37 serving as a returning and branching part for branching and returning a part of the optical signal to be dropped from the dropped optical signal generation part 38 to relay the same part, and a regeneratively relayed optical signal generation part 39 for generating an optical signal to be regeneratively relayed based on the optical signal to be dropped returned by the returning and branching part 37.

Specifically, the dropped optical signal generation parts 28 and 38 receive the input of wavelength separated signals having a relatively steep and narrow wavelength spectrum from the WDM unit 13a as the optical signals from the transmission routes 15RR and 15LR, respectively, performs required electrical signal processing on the optical signals, and converts electrical signals obtained by the signal processing into optical signals having relatively gentle and wide wavelength spectrum.

The regeneratively relayed optical signal generation parts 29 and 39 convert the above described optical signals to be dropped from the couplers 27 and 37 into electrical signals, perform signal processing to regeneratively relay the electrical signals, and thereafter converts the electrical signals subjected to the regeneratively relaying process into optical signals having a relatively steep and narrow wavelength spectrum as optical signals to be transmitted to the transmission routes 15RR and 15LR through the WDM unit 13a (as optical signals to be continued).

Further, the protection process unit 13c is composed of couplers 27 and 37 as first and second optical signal extraction parts for extracting optical signals to be dropped from the dropped optical signal generation parts 28 of the first and second regenerative relay units 13b-1 and 13b-2, respectively, and an optical signal selection switch 40. In other words, the above-described function of the first regenerative relay unit 13b-1 as a returning and branching part and the function of the protection process unit 13c as the first optical signal component extraction part can share the coupler 27, and the function of the second regenerative relay unit 13b-2 as a returning and branching part and the function of the protection process unit 13c as the second optical signal extraction part can share the coupler 37.

The optical signal selection switch 40 of the protection process unit 13c selects either of the optical signal components extracted by the couplers 27 and 37 as the first and second optical signal component extraction parts as a drop signal, while being subjected to the switching control from a control unit 13e which will be described later.

Further, the dropped optical signal generation part 28 of the above-described first regenerative relay unit 13b-1 is composed of a first optical-to-electrical (O/E) conversion part 21 for converting the optical signal from the clockwise transmission route 15RR into an electrical signal, a dropped electrical signal generation part 22 for generating an electrical signal to be dropped from the electrical signal obtained by the conversion at the first optical-to-electrical conversion part 21, and a first electrical-to-optical (E/O) conversion part 23 for converting the electrical signal to be dropped generated by the dropped electrical signal generation part 22 into the above-described optical signal to be dropped.

Similarly, the dropped optical signal generation part 38 of the above-described second regenerative relay unit 13b-2 is composed of a first optical-to-electrical (O/E) conversion part 31 for converting the optical signal from the counterclockwise transmission route 15LR into an electrical signal, a dropped electrical signal generation part 32 for generating an electrical signal to be dropped from the electrical signal obtained by the conversion at the first optical-to-electrical conversion part 31, and a first electrical-to-optical (E/O) conversion part 33 for converting the electrical signal to be dropped generated by the dropped electrical signal generation part 32 into the above described optical signal to be dropped.

The regeneratively relayed optical signal generation part 29 of the first regenerative relay unit 13b-1 is composed of a second optical-to-electrical (O/E) conversion part 24 for converting the optical signal to be dropped returned by the returning and branching part 27 into an electrical signal, a regeneratively relayed electrical signal generation part 25 for generating an electrical signal to be regeneratively relayed from the electrical signal obtained by the conversion at the second optical-to-electrical conversion part 24, and a second electrical-to-optical (E/O) conversion part 26 for converting the electrical signal to be regeneratively relayed into the above described optical signal to be regeneratively relayed.

Similarly, the regeneratively relayed optical signal generation part 39 of the second regenerative relay unit 13b-2 is composed of a second optical-to-electrical (O/E) conversion part 34 for converting the optical signal to be dropped returned by the returning and branching part 39 into an electrical signal, a regeneratively relayed electrical signal generation part 35 for generating an electrical signal to be regeneratively relayed from the electrical signal obtained by the conversion at the second optical-to-electrical conversion part 34, and a second electrical-to-optical (E/O) conversion part 36 for converting the electrical signal to be regeneratively relayed into the above-described optical signal to be regeneratively relayed.

Further, the control unit 13e controls the switch 40 of the protection process unit 13c such that either of the signal components from the first and second regenerative relay units is selectively output as a drop depending on the degree of deterioration of the optical signals input from the clockwise transmission route 15RR and the counterclockwise transmission route 15LR.

Specifically, referring to the control unit 13c of the receiving and relaying station 13, it recognizes the degree of deterioration of an optical signal input from the clockwise transmission route 15RR based on a signal from the dropped electrical signal generation part 22 of the first regenerative relay unit 13b-1, recognizes the degree of deterioration of an optical signal input from the counterclockwise transmission route 15LR based on a signal from the dropped electrical signal generation part 32 of the second regenerative relay unit 13b-2, and controls the switch 40 such that the signal at the lower degree of deterioration is selectively output (dropped).

All of the above described dropped electrical signal generation parts 22 and 32 and the regeneratively relayed electrical signal generating parts 25 and 35 have a function of performing signal processing in a layer of an order higher than a physical layer including an overhead process on a multiplex frame and, in particular, the dropped electrical signal generation parts 22 and 32 notify the control unit 13e of contents written in an overhead as information on signal deterioration.

Operations of the OUPSR network 10 utilizing the receiving and relaying stations (relay transmission apparatus) 12 to 14 according to the first embodiment of the present invention having the above described configuration will now be described with reference to FIG. 1.

First, the signal distributing station 11 distributes a large volume of data to the receiving and relaying stations 12 to 14. At this time, a signal that constitutes the large volume of data to be transmitted from the signal distributing station 11 to the receiving and relaying stations 12 to 14 is transmitted in two directions through the clockwise transmission route 15RR and the counterclockwise transmission route 15LR.

At this time, in the route in which the signal is transmitted from the signal distributing station 11 as the starting point to the receiving and relaying station 12, the receiving and relaying station 13, and the receiving and relaying station 14 in the order listed through the clockwise transmission route 15RR (clockwise route), the receiving and relaying stations 12 and 13 acting as relaying stations perform a drop-and-continue process on the signal along with a signal regenerating process, and the receiving and relaying station 14 acting as a terminal station drops the signal.

In the route in which the signal is transmitted from the signal distributing station 11 as the starting point to the receiving and relaying station 14, the receiving and relaying station 13, and the receiving and relaying station 12 in the order listed through the counterclockwise transmission route 15LR (counterclockwise route), the receiving and relaying stations 14 and 13 acting as relaying stations perform a drop-and-continue process on the signal along with a signal regenerating process, and the receiving and relaying station 12 acting as a terminal station drops the signal.

At this time, for example, the receiving and relaying station 13 acting as a relaying station regenerates the signals transmitted through the clockwise transmission route 15RR and the counterclockwise transmission route 15LR by passing them through the separate regenerative relay units 13b-1 and 13b-2 and allows the signals to be continued by returning a part of the optical signal components with the couplers 27 and 37 acting as signal returning parts.

The signals thus continued are output again to the transmission routes 15 through the regenerative relay units 13b-1 and 13b-2 and the WDM unit 13a and are transmitted to the downstream receiving and relaying stations in the ring route. Specifically, the signal with a continuation about the signal transmitted from the receiving and relay station 12 through the clockwise transmission route 15RR passes through the first regenerative relay unit 13b-1 and the WDM unit 13a to be transmitted to the receiving and relaying station 14 through the clockwise transmission route 15RR. The signal with a continuation about the signal transmitted from the receiving and relay station 14 through the counterclockwise transmission route 15LR passes through the second regenerative relay unit 13b-2 and the WDM unit 13a to be transmitted to the receiving and relaying station 12 through the counterclockwise transmission route 15LR.

The rest of the optical signal components which have been branched by the couplers 27 and 37 shown in FIG. 2 are input to the switch 40 for a protection process as drop signals, and either of the signals is selectively output to the data receiving unit 13d.

At that time, the control unit 13e activates the switch 40 of the protection process unit 13c based on information on deterioration of the received signals from the dropped electrical signal generation parts 22 and 32 of the first and second regenerative relay units 13b-1 and 13b-2 to output either of the drop signals in the two directions to the data receiving unit 13d selectively.

As thus described, the relay transmission apparatus according to the first embodiment of the present invention can drop either of signals optically transmitted through the transmission routes 15RR and 15LR following two routes using a protection process while performing regenerating process of the signals optically transmitted through the transmission routes 15RR and 15LR following two routes at the first and second regenerative relay units. This is advantageous in that the effectiveness of a protection function provided by OUPSR can be improved by suppressing variation of an OSNR value attributable to the distance over which signals are transmitted in the OUPSR network 10.

It is not essential that all of the receiving and relaying stations 12 to 14 connected to the network 10 have the function of the above described transponder units 12b to 14b. For example, only the receiving and relaying station 13 may be provided with the function of the transponder unit 13b, and the other receiving and relaying stations 12 and 14 may have the same configuration as that shown in FIG. 16 (reference numerals 102 and 104).

In the first embodiment, the OUPSR network 10 has three constituent relay transmission apparatus, i.e., the receiving and relaying stations 12 to 14. According to the present invention, however, an OUPSR network for performing multicast transmission may be configured with a different number of relay transmission apparatus.

Further, the above-described returning and branching parts 27 and 37 are included in the package of the protection process unit 13c. According to the present invention, however, they may be included in the packages of the transponder units 13b-1 and 13b-2, respectively.

In the fist regenerative relay unit 13b-1 and the second regenerative relay unit 13b-2, an optical signal is temporarily converted into an electrical signal. The present invention is not limited to this arrangement and, for example, a configuration employing a 3R (reamplification, retiming, and reshaping) optical regenerator as disclosed in an article "Ultra-High Speed Photonics Network", Hiroshi Onaka et al., Fujitsu vol. 54, No. 4, pp. 314-322 (2003.7) may be used. Further, the dropped optical signal generation parts 28 and 38 of the first regenerative relay unit 13b-1 and the second regenerative relay unit 13b-2, respectively, may be 3R regenerators provided separately.

[A1] Description of Modification of the First Embodiment

Figure 3:
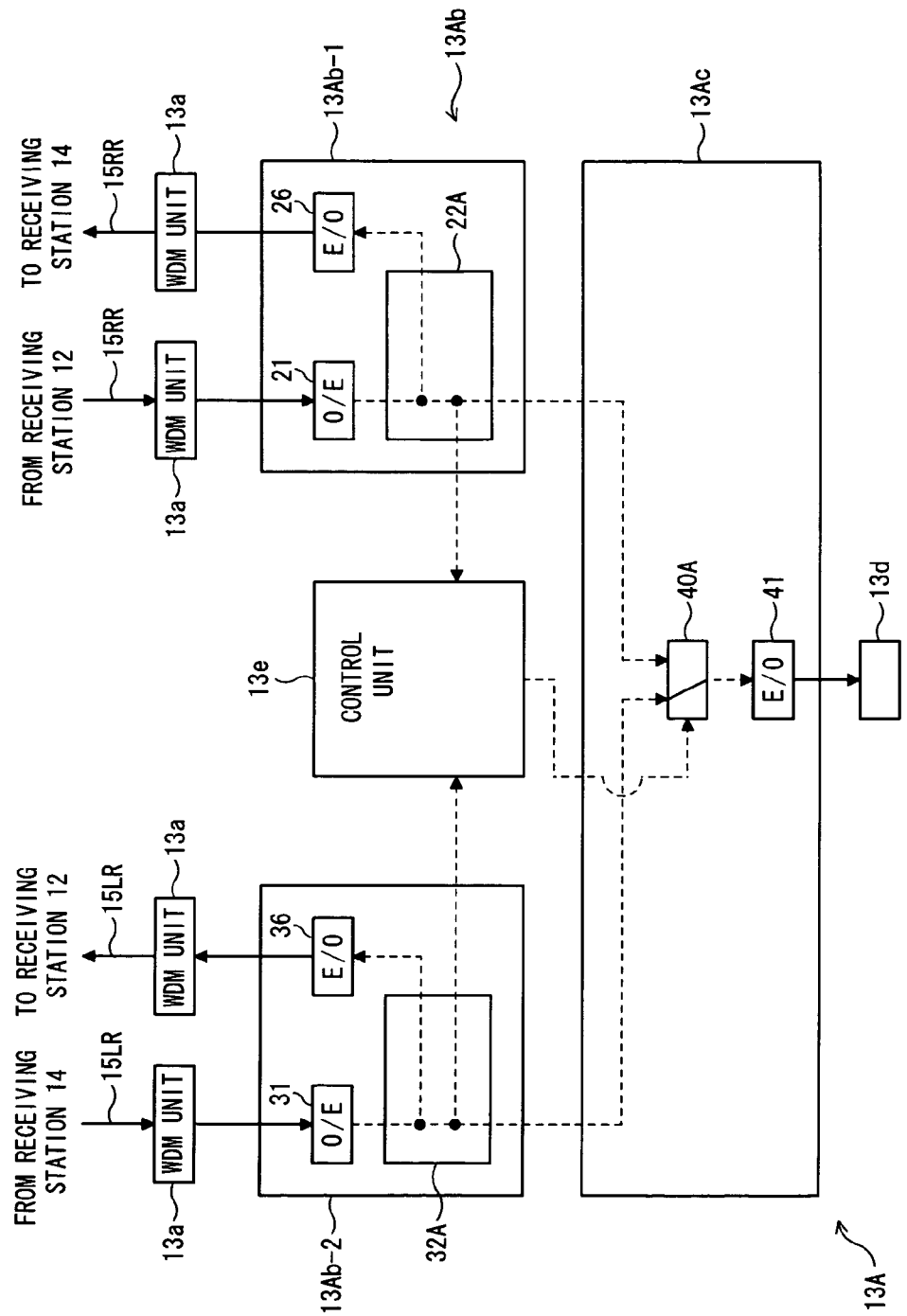
FIG. 3 is a block diagram of a relay transmission apparatus according to a modification example of the first embodiment of the present invention.

FIG. 3 is a block diagram showing major parts of a relay transmission apparatus 13A according to a modification of the first embodiment of the present invention. The relay transmission apparatus 13A shown in FIG. 3 has a transponder unit 13Ab and a protection unit 13Ac, which are different in configuration from the transponder unit 13b, and the protection process unit 13c of the relay transmission apparatus 13 of the first embodiment described above. The configuration of elements other than the transponder unit 13Ab and the protection unit 13Ac is basically the same as that in the first embodiment, and reference numerals in FIG. 3 identical to those in FIG. 2 indicate substantially like parts.

The transponder unit 13Ab of the relay transmission apparatus 13A shown in FIG. 3 has a first regenerative relay unit 13Ab-1 and a second regenerative relay unit 13Ab-2 similar to those in the first embodiment. However, the first and second regenerative relay units 13Ab-1 and 13Ab-2 pass an electrical signal to be dropped to the protection process unit 13Ac unlike those in the first embodiment.

Therefore, the first regenerative relay unit 13Ab-1 is composed of an optical-to-electrical (O/E) conversion part 21 for converting an optical signal from a transmission route 15RR which is clockwise to be a first transmitting direction into an electrical signal, an electrical stage processing part 22A for generating an electrical signal to be dropped and an electrical signal to be regeneratively relayed from the electrical signal obtained by the conversion at the optical-to-electrical conversion part 21, and a first electrical-to-optical (E/O) conversion part 26 for converting the electrical signal to be regeneratively relayed from the electrical state processing part 22A into an optical signal to be regeneratively relayed.

Similarly, the second regenerative relay unit 13Ab-2 is composed of an optical-to-electrical (O/E) conversion part 31 for converting an optical signal from a transmission route 15LR which is clockwise to be a second transmitting direction into an electrical signal, an electrical stage processing part 32A for generating an electrical signal to be dropped and an electrical signal to be regeneratively relayed from the electrical signal obtained by the conversion at the optical-to-electrical conversion part 21, and a first electrical-to-optical (E/O) conversion part 36 for converting the electrical signal to be regeneratively relayed from the electrical state processing part 32A into an optical signal to be regeneratively relayed.

The protection process unit 13Ac is composed of an electrical signal selection switch 40A which receives the input of the electrical signals to be dropped from the electrical stage processing parts 22A and 32A of the first and second regenerative relay units 13Ab-1 and 13Ab-2, respectively and which selectively outputs either of the input electrical signals to be dropped as a drop signal and a second electrical-to-optical (E/O) conversion part 41 for converting the electrical signal output by the electrical signal selection switch 40A into an optical signal to be dropped.

A control unit 13e recognizes the degree of deterioration of the optical signal input from the clockwise transmission route 15RR based on the signal from the electrical stage processing part 22A of the first regenerative relay unit 13Ab-1 and recognizes the degree of deterioration of the optical signal input from the counterclockwise transmission route 15LR based on the signal from the electrical stage processing part 32A of the second regenerative relay unit 13Ab-2 to control the switch 40A such that the signal at the lower degree of deterioration will be output (dropped).

In the relay transmission apparatus 13A having such a configuration, the optical signal from the clockwise transmission route 15RR is input to the first regenerative relay unit 13Ab-1 through a WDM unit 13a, and the optical signal from the counterclockwise transmission route 15LR is input to the second regenerative relay unit 13Ab-2 through the WDM unit 13a.

The input optical signals are converted into electrical signals by the optical-to-electrical conversion parts 21 and 31 of the first and second regenerative relay units 13Ab-1 and 13Ab-2, respectively. Signal processing at a layer of an order higher than a physical layer such as processing of an overhead of a transmission frame is performed to generate the electrical signal to be dropped and the electrical signal to be regeneratively relayed in the electrical stage processing parts 22A and 32A. Further, the electrical stage processing parts 22A and 32A pass information on signal deterioration written in an overhead or the like to the control unit 13e.

Further, the control unit 13e recognizes the degree of deterioration of the optical signals transmitted through the clockwise transmission route 15RR and the counterclockwise transmission route 15LR based on the information on signal deterioration from the electrical stage processing parts 22A and 32A and controls the switching of the switch 40A of the protection process unit 13Ac.

Specifically, the switch 40A is controlled by the control unit 13e to selectively output either of the signals transmitted from the electrical stage processing parts 22A and 32A of the first and second regenerative relay units 13Ab-1 and 13Ab-2, the output signal being at the lower degree of deterioration. A protecting operation is thus achieved. The electrical signal output by the switch 40A is converted by the second electrical-to-optical conversion part 41 into an optical signal having a relatively wide wavelength spectrum which is then output to a data receiving unit 13d.

Thus, the present modification not only provides the same advantages as those in the first embodiment but also provides the function of the electrical-to-optical conversion parts 23 and 33 with the single electrical-to-optical conversion part 41 and eliminates the need for the function of the optical-to-electrical conversion parts 24 and 34. This is advantageous in that the number of components required for photoelectrical conversion can be reduced and in that the scale and manufacturing cost of an apparatus can therefore be reduced.

Although the present modification has been described as a modification of the configuration of the receiving and relaying station 13 shown in FIG. 1, receiving and relaying stations other than the receiving and relaying station 13, i.e., the stations 12 and 14 may have the same configuration.

[B] Description of the Second Embodiment

Figure 4:
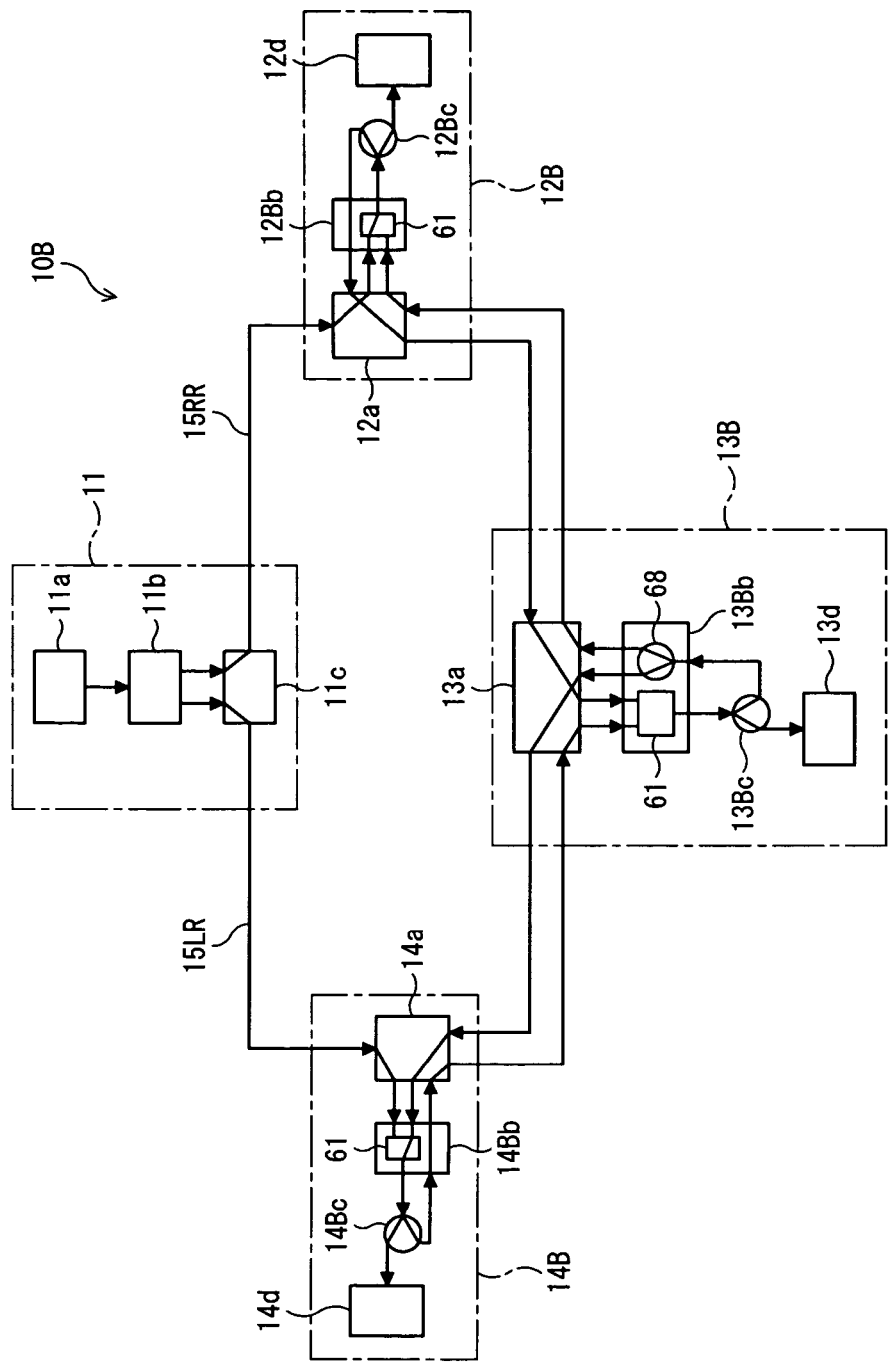
FIG. 4 is a view showing an OUPSR network to which relay transmission apparatus according to a second embodiment of the present invention is applied.

FIG. 4 shows an OUPSR network employing relay transmission apparatus according to a second embodiment of the invention. An OUPSR network 10B shown in FIG. 4 has receiving and relaying stations 12B to 14B, which are relay transmission apparatus having a configuration different from that shown in FIG. 1 (reference number 10). The configuration of the OUPSR network 10B except the receiving and relaying stations 12B to 14B is substantially the same as that in the first embodiment, and reference numerals in FIG. 4 identical to those in FIG. 1 indicate like parts.

Specifically, the receiving and relaying stations 12B to 14B have a drop-and-continue function similarly to those in the first embodiment. Referring to a drop signal, they have a function of selecting either of signals transmitted through transmission routes 15RR and 15LR following two different routes as a received signal using an OUPSR protection process.

Referring to a configuration of a main signal processing system of the receiving and relaying stations 12B to 14B, those receiving and relaying stations 12B to 14B have WDMs 12a to 14a and data receiving units 12d to 14d similar to those in the first embodiment, and they have also transponder units 12Bb to 14Bb and returning and branching units 12Bc to 14Bc which have configurations characteristic of the second embodiment.

Figure 5:
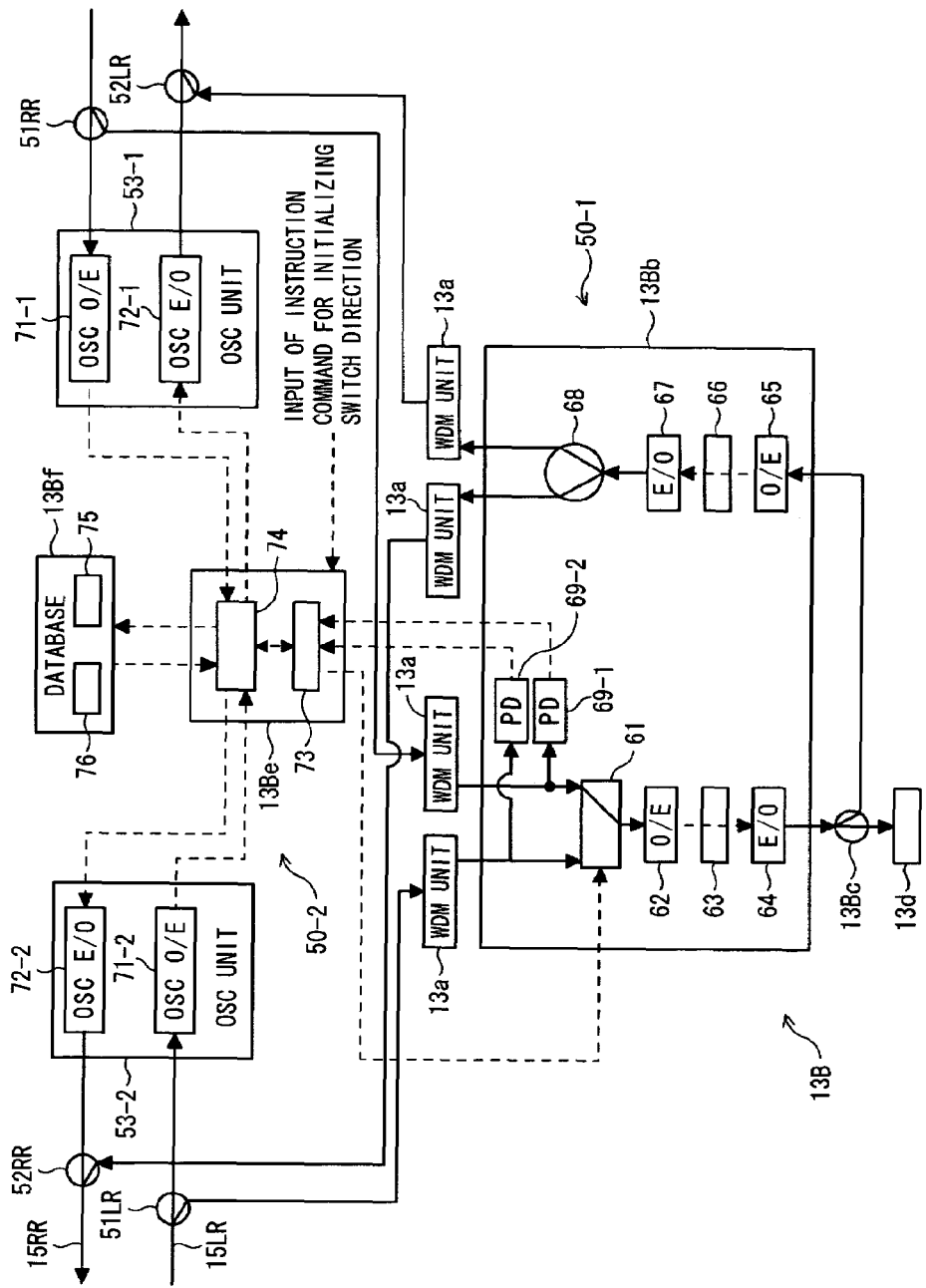
FIG. 5 is a block diagram showing the relay transmission apparatus according to the second embodiment of the present invention.

Referring particularly to the receiving and relaying station 13B among the receiving and relaying stations 12B to 14B, for example, as shown in FIG. 5, the station 13B is comprised of a main signal processing system 50-1 and a control signal processing system 50-2, and it also has branching units 51RR and 51LR and wave multiplexing units 52RR and 52LR.

The branching unit 51RR branches a wavelength multiplex optical signal transmitted through the clockwise transmission route 15RR into two signals, outputs one of the signals to the WDM unit 13a which forms a part of the main signal processing system 50-1, and outputs the other to the control signal processing system 50-2. The branching unit 51LR branches a wavelength multiplex optical signal transmitted through the counterclockwise transmission route 15LR into two signals, outputs one of the signals to the WDM unit 13a which forms a part of the main signal processing system 50-1, and outputs the other to the control signal processing system 50-2.

Further, the wave multiplexing unit 52RR multiplexes a wavelength multiplex optical signal from the WDM unit 13a to be transmitted through the clockwise transmission route 15RR with an optical signal in a control channel from the control signal processing system 50-2 and transmits them to the clockwise transmission route 15RR. The wave multiplexing unit 52LR multiplexes a wavelength multiplex optical signal from the WDM unit 13a to be transmitted through the counterclockwise transmission route 15LR with an optical signal in a control channel from the control signal processing system 50-2 and transmits them to the counterclockwise transmission route 15LR.

The transponder unit 13Bb forming a part of the main signal processing system 50-1 is composed of an optical switch 61, a first optical-to-electrical conversion part 62, a dropped electrical signal generation part 63, a first electrical-to-optical conversion part 64, a second optical-to-electrical conversion part 65, a regeneratively relayed electrical signal generation part 66, a second electrical-to-optical conversion part 67, a branching part 68, and photodiodes (PDs) 69-1 and 69-2.

Further, the optical switch 61 of the transponder unit 13Bb selectively outputs either of an optical signal from the clockwise transmission route 15RR and an optical signal from the counterclockwise transmission route 15LR which are input from the WDM unit 13a based on a control signal from a control unit 13Be that forms a part of the control signal processing system 50-2 which will be described later. In other words, the switch 61 functions as a protection process unit for selectively outputting either of an optical signal input from the clockwise transmission route 15SRR and an optical signal input from the counterclockwise transmission route 15RL.

The first optical-to-electrical conversion part 62 converts the optical signal from the optical switch 61 into an electrical signal. The dropped electrical signal generation part 63 generates an electrical signal to be dropped from the electrical signal from the first optical-to-electrical conversion part 62. The first electrical-to-optical conversion part 64 converts the electrical signal to be dropped generated by the dropped electrical signal generation part 63 into an optical signal to be dropped.

Further, the second optical-to-electrical conversion part 65 converts an optical signal to be dropped, which had been returned by the returning and branching part 13Bc as described later, into an electrical signal. The regeneratively relayed electrical signal generation part 66 generates an electrical signal to be regeneratively relayed from the electrical signal from the second optical-to-electrical conversion part 65. The second electrical-to-optical conversion part 67 converts the electrical signal to be regeneratively relayed from the regeneratively relayed electrical signal generation part 66 into an optical signal to be regeneratively relayed.

Further, the returning and branching unit 13Bc branches and returns a part of the optical signal to be dropped from the first electrical-to-optical conversion part 64, and it may be constituted by a coupler, for example. Specifically, the returning process unit 13Bc branches the optical signal to be dropped from the first electrical-to-optical conversion part 64 into two signals, outputs either of the signals to the data receiving unit 13d, and outputs the other to the second optical-to-electrical conversion part 65 to regeneratively relay the same.

Therefore, the first optical-to-electrical conversion part 62, the dropped electrical signal generation part 63, the first electrical-to-optical conversion part 64, the second optical-to-electrical conversion part 65, the regeneratively relayed electrical signal generation part 66, the second electrical-to-optical conversion part 67, and the returning and branching part 13Bc constitute an optical signal generation unit which generates an optical signal to be regeneratively relayed, which has been subjected to a regeneration process, along with an optical signal to be dropped based on the optical signal output from the optical switch 61.

The branching part 68 branches the optical signal to be regeneratively relayed generated by the second electrical-to-optical conversion part 67 into two signals which are to be transmitted to the clockwise transmission route 15RR and the counterclockwise transmission route 15LR, respectively, and it may be constituted by a coupler, for example. Specifically, one of the optical signal to be regeneratively relayed branched by the branching part 68 is transmitted to the clockwise transmission route 15RR through the WDM unit 13a, and the other optical signal to be regeneratively relayed is transmitted to the counterclockwise transmission route 15LR through the WDM unit 13a. At this time, the WDM unit 13a transmits them as wavelength multiplex optical signals with a signal in another wavelength channel.

Referring to FIG. 4, the receiving and relaying station 12B is a receiving and relaying station at the end of the counterclockwise transmission route 15LR, and the transponder unit 12Bb may be configured without the branching part 68 so that it transmits the optical signal to be regeneratively relayed only to the clockwise transmission route 15RR. The receiving and relaying station 14B is a receiving and relaying station at the end of the clockwise transmission route 15RR, and the transponder unit 14Bb may be configured without the branching part 68 so that it transmits the optical signal to be regeneratively relayed only to the counterclockwise transmission route 15LR.

Further, the photodiode 69-1 converts the optical signal transmitted from the WDM unit 13a through the clockwise transmission route 15RR into an electrical signal, and the electrical signal as a result of the conversion is output to the control unit 13Be. The photodiode 69-2 converts the optical signal transmitted from the WDM unit 13a through the counterclockwise transmission route 15LR into an electrical signal, and the electrical signal as a result of the conversion is output to the control unit 13Be.

Furthermore, the control signal processing system 50-2 processes monitoring and control signals transmitted through a control channel wavelength in the OUPSR network 10B. Specifically, it performs signal processing on control signals and monitoring signals exchanged between the signal distributing station 11 and the receiving and relaying stations 12B to 14B and comprises OSC units 53-1 and 53-2, a control unit 13Be, and a database 13Bf.

The OSC (Optical Supervisor Channel) units 53-1 and 53-2 have OSC optical-to-electrical conversion (OSC O/E) parts 71-1 and 71-2 and OSC electrical-to-optical conversion (OSC E/O) parts 72-1 and 72-2.

The OSC optical-to-electrical conversion (OSC O/E) part 71-1 of the OSC unit 53-1 receives the input of an optical signal transmitted through the clockwise transmission route 15RR at its branching part 51RR, extracts a monitoring/control optical signal, which has been modulated with the wavelength of a control channel, from the input optical signal and outputs it to the control unit 13Be, the signal being extracted as an electrical signal. The OSC optical-to-electrical (OSC E/O) conversion part 72-1 of the OSC unit 53-1 converts (modulates) a monitoring/control electrical signal from the control unit 13Be into a monitoring/control optical signal having the wavelength of the control channel and transmits it through the counterclockwise transmission route 15LR.

Similarly, the OSC optical-to-electrical conversion (OSC O/E) part 71-2 of the OSC unit 53-2 receives the input of an optical signal transmitted through the counterclockwise transmission route 15LR at its branching part 51LR, extracts a monitoring/control optical signal, which has been modulated with the wavelength of the control channel, from the input optical signal and outputs it to the control unit 13Be, with the signal being extracted as an electrical signal. The OSC optical-to-electrical (OSC E/O) conversion part 72-2 of the OSC unit 53-2 converts (modulates) a monitoring/control electrical signal from the control unit 13Be into a monitoring/control optical signal having the wavelength of the control channel and transmits it through the clockwise transmission route 15RR.

The control unit 13Be determines the levels of signals transmitted through the clockwise transmission route 15RR and the counterclockwise transmission route 15LR based on signals from the photodiodes 69-1 and 69-2 of the transponder unit 13Bb; and controls the switching of the optical switch 61 such that the signal having better quality will be selectively output by the optical switch 61, which serves as a protection process.

Further, the control unit 13Be has a function of monitoring control over a switching function, corresponding to the optical switch 61, at the other receiving and relaying stations 12B and 14B through the OSC units 53-1 and 53-2, the function preventing the occurrence of an endless loop state which will be described later, in cooperation with the database 13Bf.

Figure 6:
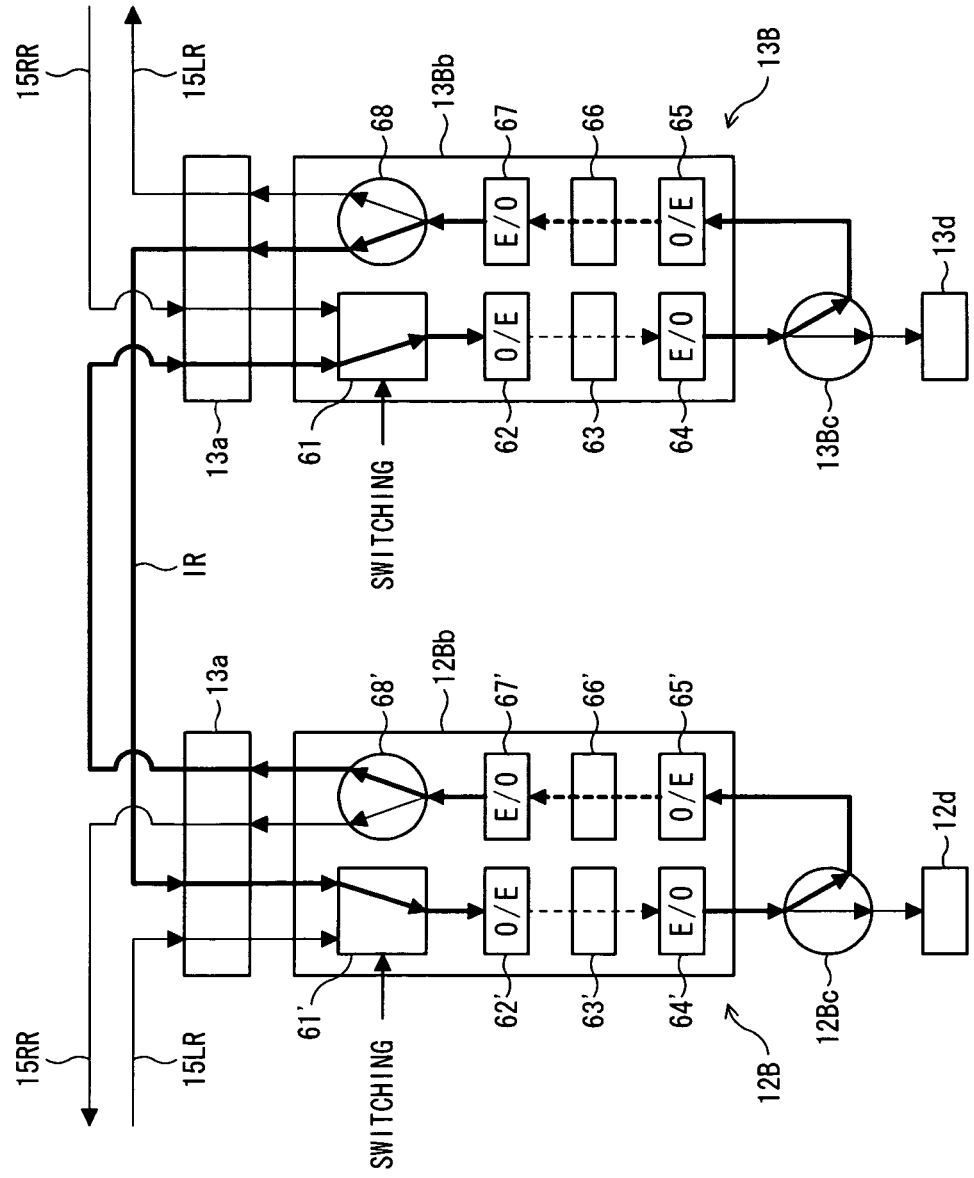
FIG. 6 is a view for explaining the generation of an endless loop.

FIG. 6 is a view for explaining an example in which an endless loop can occur as described above. In FIG. 6, a main signal route IR between the receiving and relaying stations 12B and 13B adjacent to each other is represented by a bold line as an example of an area in which an endless loop can occur. Parts of the receiving and relaying station 12B having equivalents in the receiving and relaying station 13B are indicated with a dash symbol (').

As indicated by the route IR in a bold line in FIG. 6, a signal can enter an endless loop between the receiving and relaying stations 12B to 14B depending on the state of switching (the direction of switching) of the optical switches of the receiving and relaying stations 12B to 14B (in the case of the receiving and relaying station 13B is indicated by reference numeral 61 of FIG. 5; which holds true in the following description).

Specifically, the optical switches 61' and 61 of the receiving and relaying stations 12B and 13B which are adjacent to each other are directed in the Japanese katakana character "ハ" (ha) shaped form. In other words, switches 61-12 and 61-13 are set such that they select optical signals from each other's station. In such a case, a signal transmitted between the receiving and relaying stations 12B and 13B looses its signal source and becomes an error.

That is, signals input to the receiving and relaying station 13B shown in FIG. 6 are signals coming from the receiving and relaying stations 12B and 14B, and only either of the signals selected by the switch 61-13 is output to the data receiving unit 13d that is a client. The same signal is output to the data receiving unit 12d by the returning and branching unit 13Bc and returned to the transponder unit 13Bb. The signal returned to the transponder unit 13Bb is branched into two signals by a branching part 68-1, and the identical signals are transmitted to the receiving and relaying stations 12B and 14B.

Referring now to the signal transmitted to the receiving and relaying station 12B, the receiving and relaying station 12B transmits the signal to the signal distributing station 11 and the receiving and relaying station 13 in the same way as the operation performed at the receiving and relaying station 13B. When the switch 61' of the receiving and relaying station 12B selects the signal transmitted from the receiving and relaying station 13B instead of the signal distributing station 11, the signal source is lost as indicated by the bold line in FIG. 6.

Therefore, in order to allow a signal from the signal distributing station 11 to be transmitted thorough the clockwise transmission route 15RR to follow the route starting with the signal distributing station 11 followed by the receiving and relaying station 12B, the receiving and relaying station 13B, and the receiving and relaying station 14B and to be transmitted through the counterclockwise route 15LR to follow the route starting with the signal distributing station 11 followed by the receiving and relaying station 14B, the receiving and relaying station 13B, and the receiving and relaying station 12B, all dropping stations, i.e., the receiving and relaying stations 12B to 14B must have a function of controlling the state of switching of their optical switches (61) (directing the switches uniformly) such that receiving and relaying stations adjacent to each other will not select signals from each other.

For this purpose, the receiving and relaying stations 12B to 14B as relay transmission apparatus according to the present invention have a configuration for controlling the optical switches (61) into a uniform state of switching as described below.

For example, referring to the receiving and relaying station 13B, it is composed of an endless loop avoiding control function part 74 which performs control to avoid the occurrence of an endless loop state in the OUPSR network 10B as well as a protection control function part 73 which performs ordinary control over the selection of either of optical signals transmitted through the transmission routes 15RR and 15LR in different directions based on the quality of the received signals at the control unit 13Be.

Figure 7:
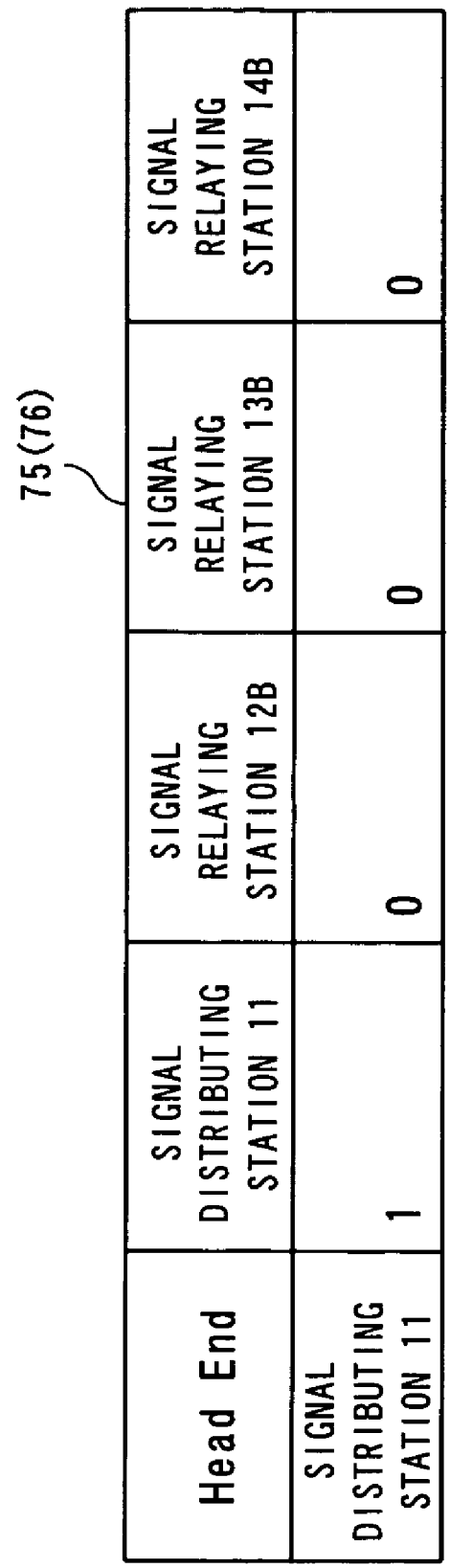
FIG. 7 is a view showing a configuration of major parts of the relay transmission apparatus according to the second embodiment of the present invention.

Further, the database 13Bf maintains control information required for control carried out by the control unit 13Be, and it has a first table 75 for managing route information of an optical signal input from the clockwise transmission route 15RR and a second table 76 for managing route information of an optical signal input from the counterclockwise transmission route 15LR, the tables being provided for each wavelength channel. As shown in FIG. 7 by way of example, the first and second tables 75 and 76 have a configuration in which "1" can be written for a station on the route of a signal in a wavelength channel of interest and in which "0" can be written for a station out of the route. In the first table 75 (second table 76) shown in FIG. 7, "1" is written for the signal distributing station 11, and "0" is written for the receiving and relaying stations 12B to 14B.

The above described control unit 13Be controls the switch 61 depending on route information managed using the first and second tables 75 and 76 and the degree of deterioration of optical signals input from the clockwise transmission route 15RR and the counterclockwise transmission route 15LR, thereby realizing an OUPSR-based protecting operation while avoiding an endless loop as described later.

A description will now be made on operations of the OUPSR network 10B employing the receiving and relaying stations (relay transmission apparatus) 12B to 14B according to the second embodiment of the present invention having the above described configuration.

First, the signal distributing station 11 distributes a signal (a large volume of data or the like) to the receiving and relaying stations 12B to 14B. At this time, a signal that constitutes a large volume of data to be transmitted from the signal distributing station 11 to the respective receiving and relaying stations 12B to 14B are transmitted in two directions through the clockwise transmission route 15RR and the counterclockwise transmission route 15LR. Each of the receiving and relaying stations 12B to 14B drops and continues the signal.

Specifically, in the route in which the signal is transmitted from the signal distributing station 11 as the starting point to the receiving and relaying station 12B, the receiving and relaying station 13B, and the receiving and relaying station 14B in the order listed through the clockwise transmission route 15RR (clockwise route), the receiving and relaying stations 12B and 13B acting as relaying stations perform a drop-and-continue process on the signal, and the receiving and relaying station 14B acting as a terminal station drops the signal. At this time, the continued signal is subjected to a signal regeneration process.

In the route in which the signal is transmitted from the signal distributing station 11 as the starting point to the receiving and relaying station 14B, the receiving and relaying station 13B, and the receiving and relaying station 12B in the order listed through the counterclockwise transmission route 15LR (counterclockwise route), the receiving and relaying stations 14B and 13B acting as relaying stations perform a drop-and-continue process on the signal, and the receiving and relaying station 12B acting as a terminal station drops the signal. At this time, the continued signal is subjected to a signal regeneration process.

The drop-and-continue process is performed by the receiving and relaying station 13B as a relaying station as follows. The station selectively outputs signals input thereto in two directions from the clockwise and counterclockwise routes using the optical switch 61 of the transponder unit 13Bb. The signal thus output is branched by the returning and branching unit 13Bc into two signals one of which is dropped.

The other of the signals branched at the returning and branching unit 13Bc is returned to the transponder unit 13Bb. The transponder unit 13Bb performs a regenerative relaying process using the signal returned by the returning and branching unit 13Bc, and the signal is thereafter branched by the branching part 68 into two. Identical signals are thus transmitted to the bidirectional to be clockwise and counterclockwise transmission routes 15RR and 15LR (a continue process). That is, the signal selected by the switch 61 is dropped and subjected to a regenerative relaying process to be transmitted to both of the receiving and relaying station 14B and the receiving and relaying station 12B.

Control as described below is conducted at the receiving and relaying stations 12B to 14B in order to prevent an endless loop.

Specifically, at the beginning of the operation of the network, the optical switches 61 of the transponder units 12Bb to 14Bb of the receiving and relaying stations 12B to 14B are uniformly set in one (clockwise or counterclockwise) signal selecting direction. A command for a trigger signal is input to the signal distributing station 11 to transmit a trigger signal through an OSC channel.

For example, "1" is transmitted for the direction in which the clockwise transmission route 15RR is followed in FIG. 4, and "0" is transmitted for the direction in which the counterclockwise transmission route 15LR is followed. At each of the receiving and relaying stations 12B to 14B, the optical switch 61 is set in the direction for which "1" has been received as a trigger signal as described above under control of the control unit 13Be. Thus, the optical switches 61 of all of the receiving and relaying stations 12B to 14B are put in a uniform state of switching.

The endless loop avoiding control function part 74 of the control unit 13Be is triggered for initialization and updating of the contents of the tables 75 and 76 when it receives the above described trigger signal from the signal distributing station 11 (through the OSC channel), when it receives a detection signal indicating signal deterioration such as LOS (Loss of Signal) that is observed when optical fibers constituting the transmission route 15RR and 15LR are broken (through the OSC channel) or when it is notified of the fact that the switch control for protection has been performed by the protection control function part 73.

Specifically, the control unit 13Be of each of the receiving and relaying stations 12B to 14B initializes and updates the first table 75 for managing information on stations that a signal received through the clockwise transmission route 15RR has passed through, and it also initializes and updates the contents of the second table 76 for managing information on stations that a signal received through the counterclockwise transmission route 15LR has passed through.

For example, let us assume that a signal in a channel #1 transmitted from the signal distributing station 11 is input to the receiving and relaying station 12B when the optical switches 61 of the receiving and relaying stations 12B to 14B are uniformly set in the direction of the clockwise route (the direction in which a signal is transmitted from the signal distributing station 11 to the receiving station 12B, the receiving station 13B, and the receiving station 14B in the order listed) as shown in FIG. 4. Then, the signal distributing station 11 notifies the receiving and relaying station 12B of the fact that the head end or the original transmitting station of the channel #1 is the signal distributing station 11, and "1" is written in the entry of the signal distributing station 11 to identify it as a station on the route, the notification being made through an OSC channel.

As a result, on the table 75 of the receiving and relaying station 12B, "signal distributing station 11" is registered in the entry of the head end, and "1" is registered in the entry of the receiving and relaying station 12B as an entry of a station on the route, as shown in FIG. 8B. At this point in time, since no signal in the wavelength channel #1 has been input to the signal distributing station 11, the contents of the tables 75 and 76 are all "0" as shown in FIG. 8A.

An OSC channel transmitted from the receiving and relaying station 12B to the receiving and relaying station 13B is OSC channel information which has been transmitted from the signal distributing station 11 to the receiving and relaying station 12B plus additional information indicating that the signal in the channel #1 has also passed through the receiving and relaying station 12B (contents indicating that "1" is written in the entry of the receiving and relaying station 12B to identify it as a station on the route) because the signal in the channel #1 transmitted from the receiving and relaying station 12B to the receiving and relaying station 13B is a signal which has come from the signal distributing station 11. As a result, the contents of the table 75 of the receiving and relaying station 13B are updated as shown in FIG. 8C.

Further, since the receiving and relaying station 13B transmits the above described signal from the receiving and relaying station 12B to the clockwise transmission route 15RR and the counterclockwise transmission route 15LR, the receiving and relaying station 14B updates the table 75 as show in FIG. 8D upon receipt of the signal, and the receiving and relaying station 12B updates the table 76 as shown in FIG. 8E. Similarly, the receiving and relaying station 13B updates the table 76 as shown in FIG. 8F, and the receiving and relaying station 14B updates the table 76 as shown in FIG. 8E.

Referring to the tables 75 and 76 of the signal distributing station 11 and the receiving and relaying stations 12B to 14B thus completed, when bits are set ("1" is set) in the tables 75 and 76 of any of the receiving a relaying stations 12B to 14B as well as the signal distributing station 11 as an entry of information identifying the station itself as a station on a route, a signal input in the direction of the route is a signal which has already passed through the station and which has been looped back. It is therefore apparent that the signal should not be selected by the optical switch 61 in order to avoid an endless loop.

Figure 9:
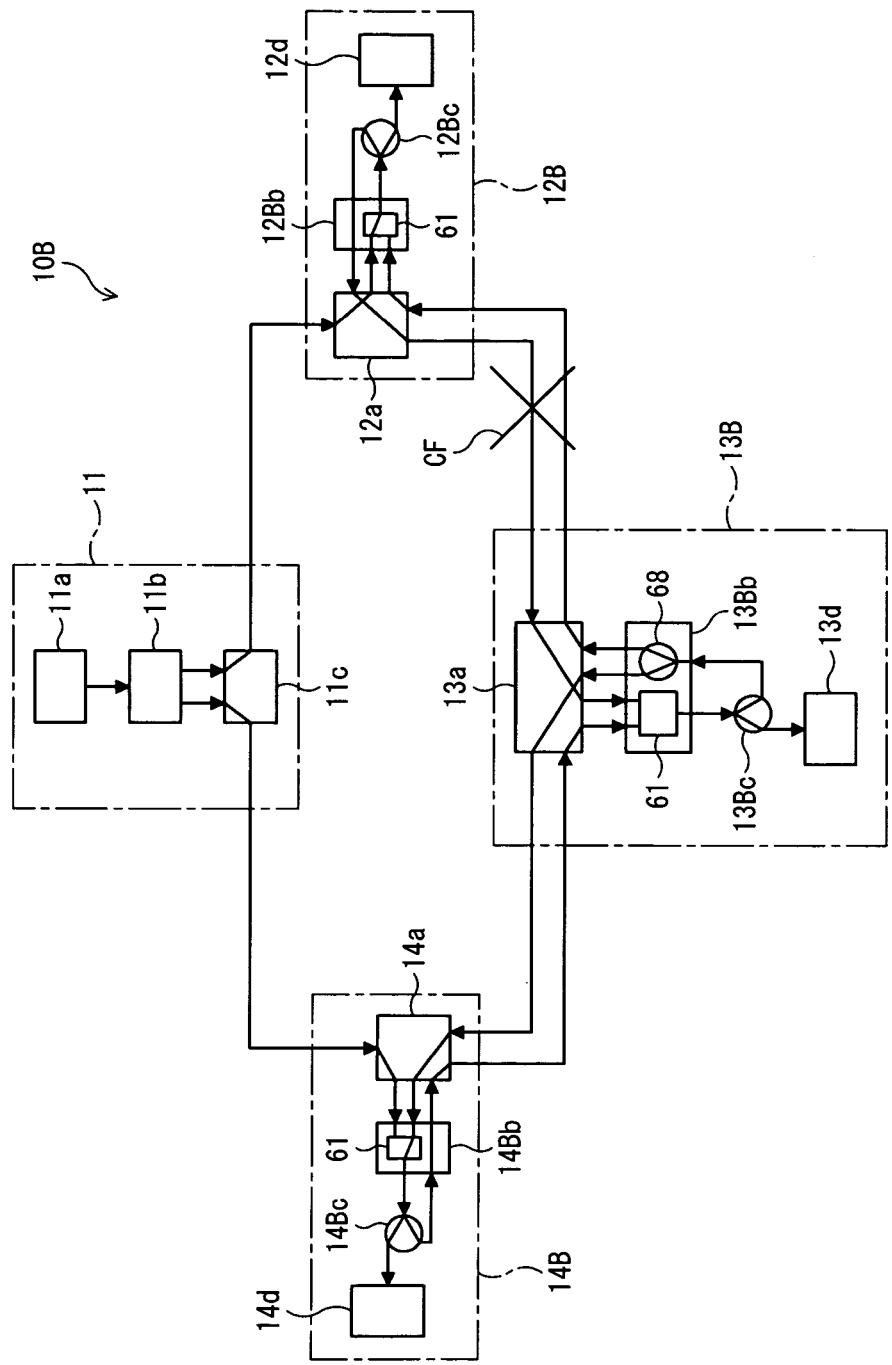
FIG. 9 is a view for explaining operations of the OUPSR network to which the relay transmission apparatus according to the second embodiment of the present invention is applied.

Let us assume that a transmission route failure CF occurs between the receiving and relaying station 12B and the receiving and relaying station 13B forming a part of the OUPSR network 10 as shown in FIG. 9 with all of the optical switches 61 of the receiving and relaying stations 12B to 14B set in the same direction as shown in FIG. 4, namely, when LOS is detected at the receiving and relaying station 12B and the receiving and relaying station 13B. Then, no signal protecting operation is required at the receiving and relaying station 12B because its switch is directed toward the signal distributing station, but the optical switch 61 of the receiving and relaying station 13B must be switched for protection.

At this time, "1" is set in the entry of the table 76 of the receiving and relaying station 13B identifying the station itself as a station on the route (See FIG. 8F), and an endless loop similar to that in FIG. 6 can occur between the receiving and relaying station 13B and the receiving and relaying station 14B if the optical switch 61 is operated for protection. As a solution to this problem, when LOS is detected by the control unit 13Be of the receiving and relaying station 13B, the endless loop avoiding control function part 74 notifies receiving and relaying stations of the need for switching using an OSC channel until a station at which protection switching can be performed is reached.

In the case shown in FIG. 9, "0" is set in the entry of the table 76 of the receiving and relaying station 14B identifying the station itself, and the optical switch 61 of the receiving and relaying station 14B can therefore be switched for protection (see FIG. 8G). Therefore, the above described notification of a need for switching is sent up to the receiving and relaying station 14B, and the optical switch 61 of the receiving and relaying station 14B is switched for protection under control of the control unit (13Be) of the same receiving and relaying station.

When switching for protection takes place at the receiving and relaying station 14B, information on the table update is communicated using an OSC channel transmitted from the receiving and relaying station 14B to the receiving and relaying station 13B. Since "0" is consequently set in the entry of the table 76 of the receiving and relaying station 13B identifying the station 13B itself, protection switching is enabled, and the optical switch 61 is switched for protection under control of the control unit 13Be.

FIG. 10A shows setting of the tables 75 and 76 of the signal distributing station 11 after the occurrence of a failure CF in a wavelength channel of interest. Similarly, FIG. 10B shows setting of the table 75 of the receiving and relaying station 12B; FIG. 10C shows setting of the table 75 of the receiving and relaying station 13B; FIG. 10D shows setting of the table 75 of the receiving and relaying station 14B; FIG. 10E shows setting of the table 76 of the receiving and relaying station 12B; FIG. 10F shows setting of the table 76 of the receiving and relaying station 13B; and FIG. 10G shows setting of the table 76 of the receiving and relaying station 14B.

Thus, stations that a signal received through the clockwise transmission route 15RR and the counterclockwise transmission route 15LR has passed through can be managed on the first table 75 and the second table 76 of each of the receiving and relaying stations 12B to 14B by transmitting such information through an OSC channel between the receiving and relaying stations 12B to 14B. The state of switching of parts of stations 12B to 14B corresponding to the optical switch 61 can be made uniformed to prevent the occurrence of an endless loop as described above.

As thus described, according to the second embodiment of the present invention, the optical switch 61 and the functioning parts 62 to 64 and 65 to 67 as protection process parts make it possible to generate a drop signal and an optical signal to be regeneratively relayed which has been subjected to a regeneration process after selecting either of signals optically transmitted through the transmission routes 15RR and 15LR following two routes using a protection process. Therefore, the same advantage as that of the first embodiment, in the OUPSR network 10B, can be achieved in that the effectiveness of a protection function provided by OUPSR can be improved by suppressing variation of an OSNR value attributable to the distance over which signals are transmitted.

Since a signal can be regeneratively relayed by each of the receiving and relaying stations 12B to 14B, the signal can be transmitted a greater ring length, and a network can be constructed in a larger scale. Since a single transponder unit sufficiently works as the transponder unit 13Bb, another advantage arises in that the number of components of an apparatus can be reduced to achieve a significant reduction in the manufacturing cost of the apparatus.

While the above described returning and branching part 13Bc is provided independently of the transponder unit 13Bb, it may be configured to be included in the package of the transponder unit 13Bb according to the present invention, which makes it possible to reduce the number of packages in an apparatus to simplify the configuration of the apparatus and to reduce failures originating in components because the number of optically coupled portions can be reduced.

While the above described optical signal generation unit of the second embodiment is composed of the first optical-to-electrical conversion part 62, the dropped electrical signal generation part 63, the first electrical-to-optical conversion part 64, the second optical-to-electrical conversion part 65, the regeneratively relayed electrical signal generation part 66, the second electrical-to-optical conversion part 67, and the returning and branching part 13Bc, the present invention is not limited to the same, and it may be possible to employ a configuration utilizing a 3R regenerator as disclosed in the above-cited article "Ultra-High Speed Photonics Network", Hiroshi Onaka et al., Fujitsu vol. 54, No. 4, pp. 314-322 (2003.7). Further, the first optical-to-electrical conversion part 62, the dropped electrical signal generation part 63, and the first electrical-to-optical conversion part 64 may be constituted with a single 3R regenerator, and the second optical-to-electrical conversion part 65, the regeneratively relayed electrical signal generation part 66, and the second electrical-to-optical conversion part 67 may be constituted with a single 3R regenerator.

[B1] Description of Modification of Second Embodiment

In the above described receiving and relaying station 13B according to the second embodiment, the returning and branching unit 13Bc is provided to cause branching into a drop signal and a continue signal. According to the present invention, however, there may be provided an electrical stage processing part which has a function of generating an electrical signal to be dropped and an electrical signal to be regeneratively relayed from an electrical signal from the first optical-to-electrical conversion part 62. This makes it possible to eliminate the second optical-to-electrical conversion part 65 that is a client and to thereby achieve a more significant reduction on the number of components than the second embodiment.

Figure 11:
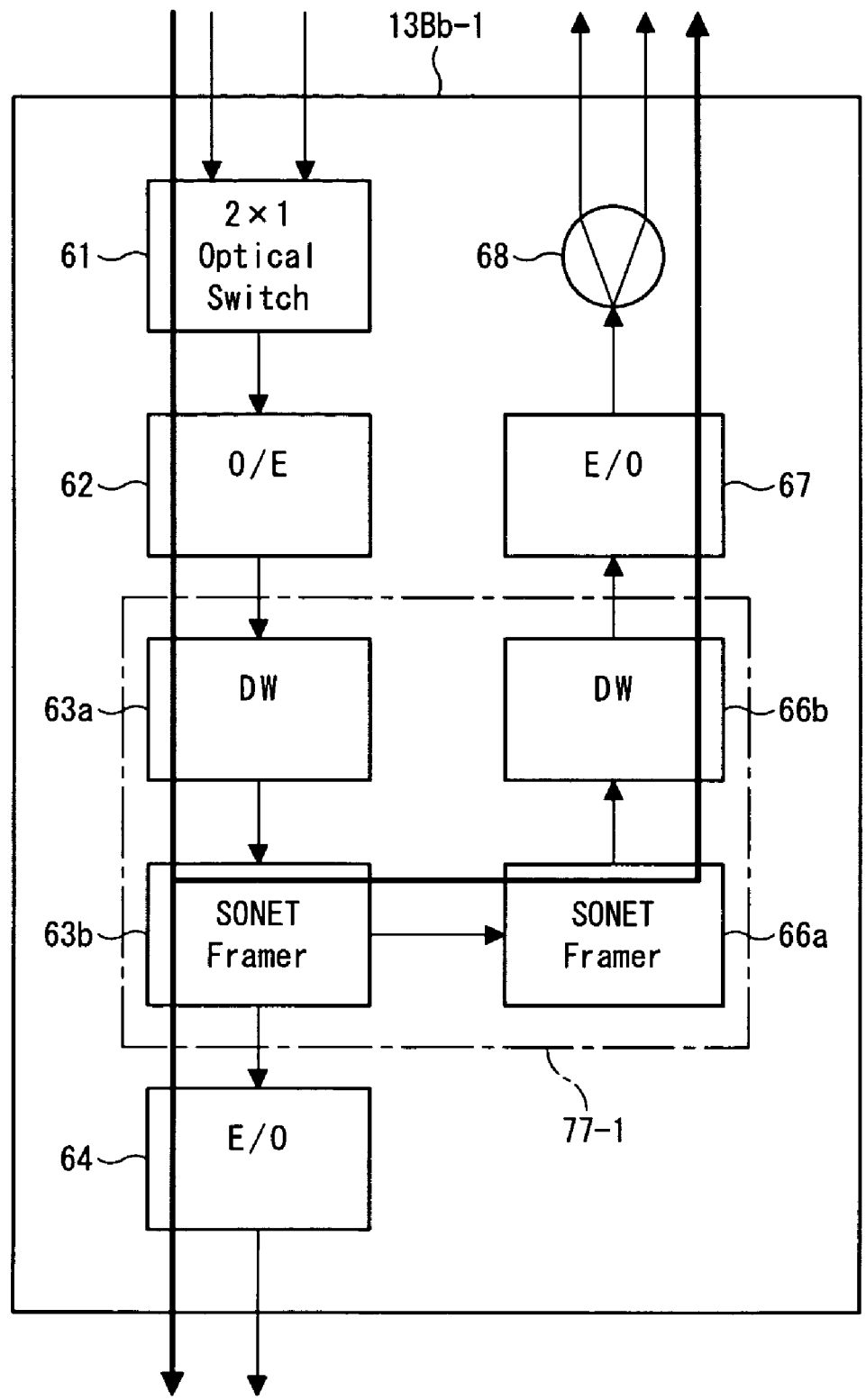
FIG. 11 is a block diagram showing a modification example of the relay transmission apparatus according to the second embodiment of the present invention.

For example, as seen in a transponder unit 13Bb-1 shown in FIG. 11, an electrical stage processing part (dropped/regeneratively relayed electrical signal generation part) 77-1 as described above may be formed by a digital wrapper (DW) 63a, SONET (Synchronous Optical Network) framers 63b and 66a, and another digital wrapper 66b. In this case, an electrical signal to be dropped is generated by the digital wrapper (DW) 63a and the SONET framer 63b. A signal from the SONET framer 63b may be looped back and passed to the SONET framer 66a to generate an electrical signal to be regeneratively relayed with the SONET framer 66a and the digital wrapper 66b. This makes it possible to achieve a reduction in the number of components as described above and to isolate a location having a failure in the SONET layer when the quality of the routes is checked or when a failure has occurred.

Figure 12:
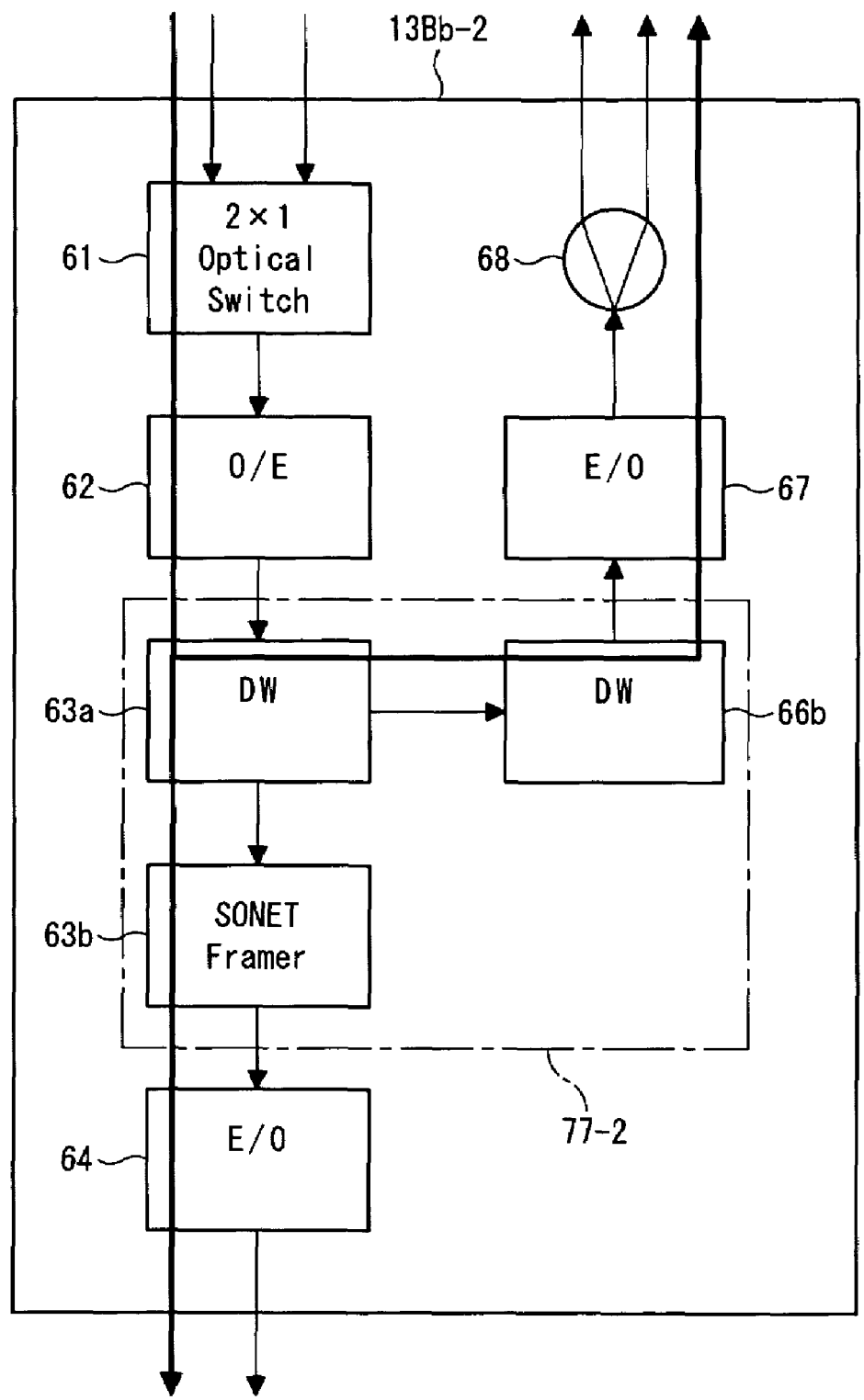
FIG. 12 is a block diagram showing another modification example of the relay transmission apparatus according to the second embodiment of the present invention.

As seen in a transponder unit 13Bb-2 shown in FIG. 12, an electrical stage processing part (dropped/regeneratively relayed electrical signal generation part) 77-2 as described above may be formed by a digital wrapper (DW) 63a, a SONET (Synchronous Optical Network) framer 63b, and another digital wrapper 66b. In this case, an electrical signal to be dropped is generated by the digital wrapper (DW) 63a and the SONET framer 63b. A signal from the digital wrapper 63a may be looped back and passed to the digital wrapper 66b to generate an electrical signal to be regeneratively relayed with the digital wrapper 66b. This makes it possible to achieve a reduction in the number of components as described above and to isolate a location having a failure in the layer of the digital wrappers when the quality of the routes is checked or when a failure has occurred.

Figure 13:
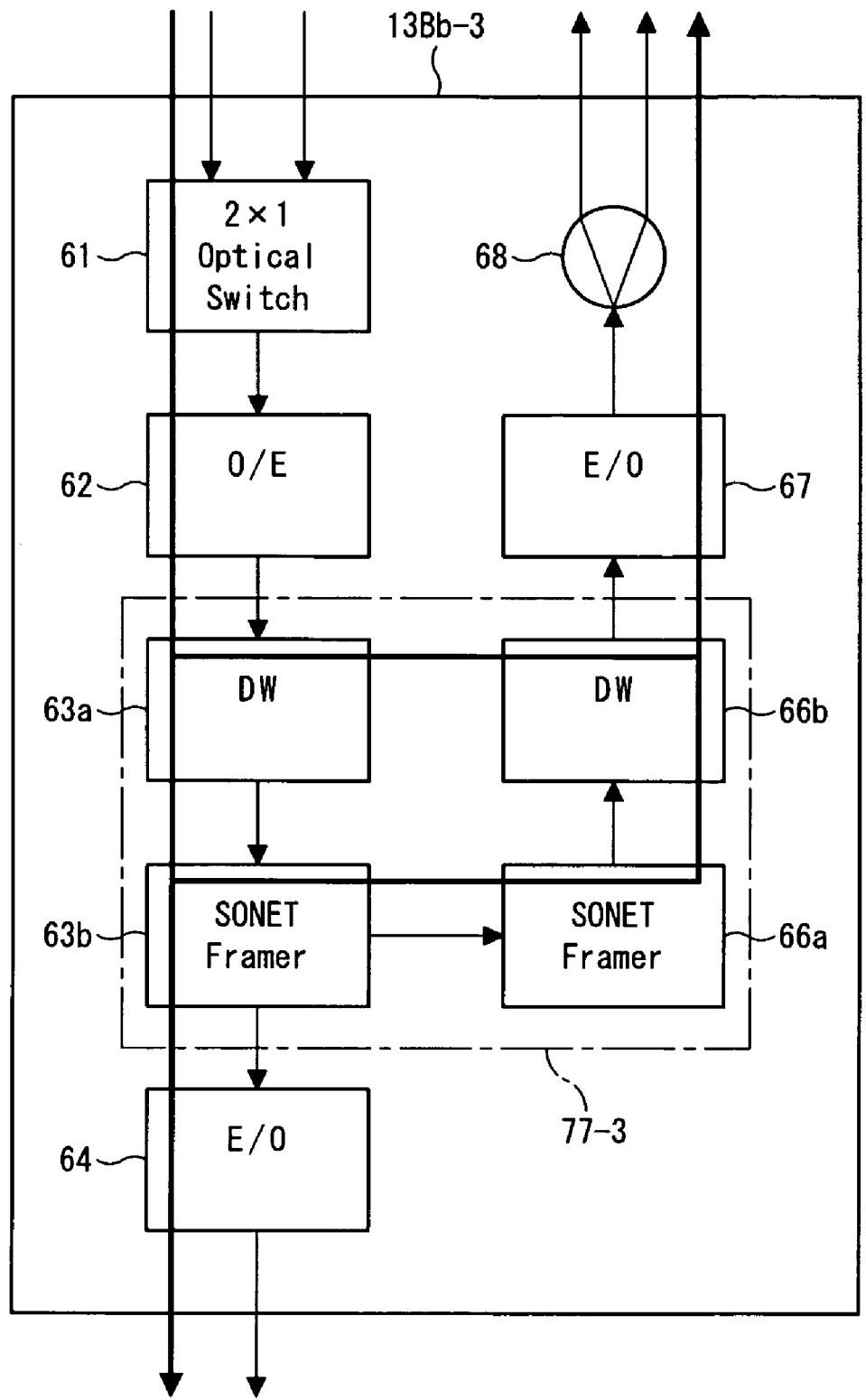
FIG. 13 is a block diagram showing still another modification of the relay transmission apparatus according to the second embodiment of the present invention.

Further, as seen in a transponder unit 13Bb-3 shown in FIG. 13, an electrical stage processing part (dropped/regeneratively relayed electrical signal generation part) 77-3 as described above may be formed by a digital wrapper (DW) 63a, SONET framers 63b and 66a, and another digital wrapper 66b. In this case, an electrical signal to be dropped is generated by the digital wrapper (DW) 63a and the SONET framer 63b. Signals from the digital wrapper 63a and the SONET framer 63b may be looped back to pass to the digital wrapper 66b and the SONET framer 66a, respectively, to generate an electrical signal to be regeneratively relayed through a cooperation of the SONET framer 66a and the digital wrapper 66b. This makes it possible to achieve a reduction in the number of components as described above and to isolate a location having a failure in the layers of the digital wrappers and SONET framers when the quality of the routes is checked or when a failure has occurred.

Figure 14:
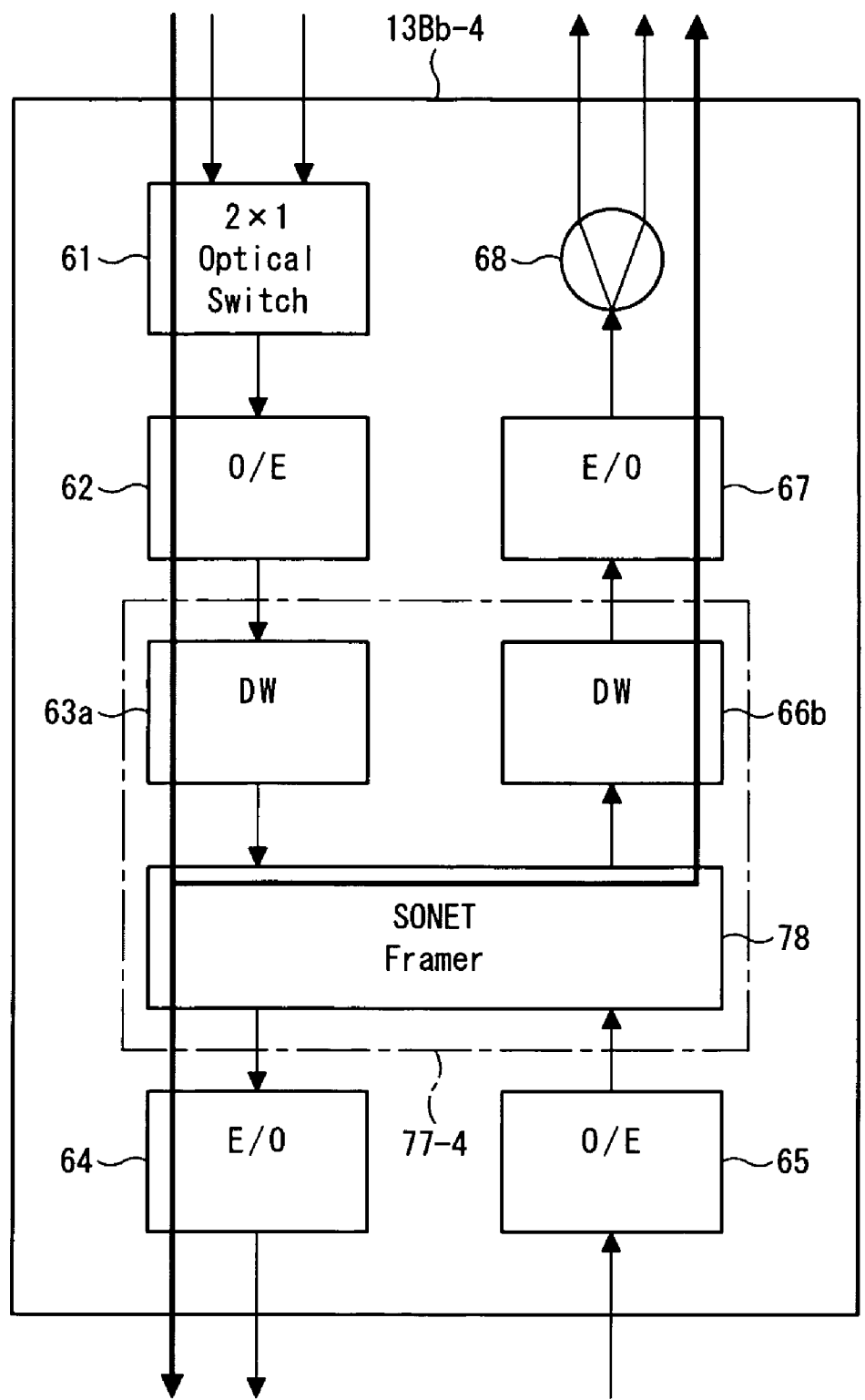
FIG. 14 is a block diagram showing still another modification of the relay transmission apparatus according to the second embodiment of the present invention.

As seen in a transponder unit 13Bb-4 shown in FIG. 14, an electrical stage processing part (dropped/regeneratively relayed electrical signal generation part) 77-4 as described above may be formed by a digital wrapper (DW) 63a, a SONET framer 78, and another digital wrapper 66b. In this case, the SONET framer 78 can generate an electrical signal to be dropped based on a signal from the digital wrapper 63a and can generate an electrical signal to be regeneratively relayed in cooperation with the digital wrapper 66b.

Figure 15:
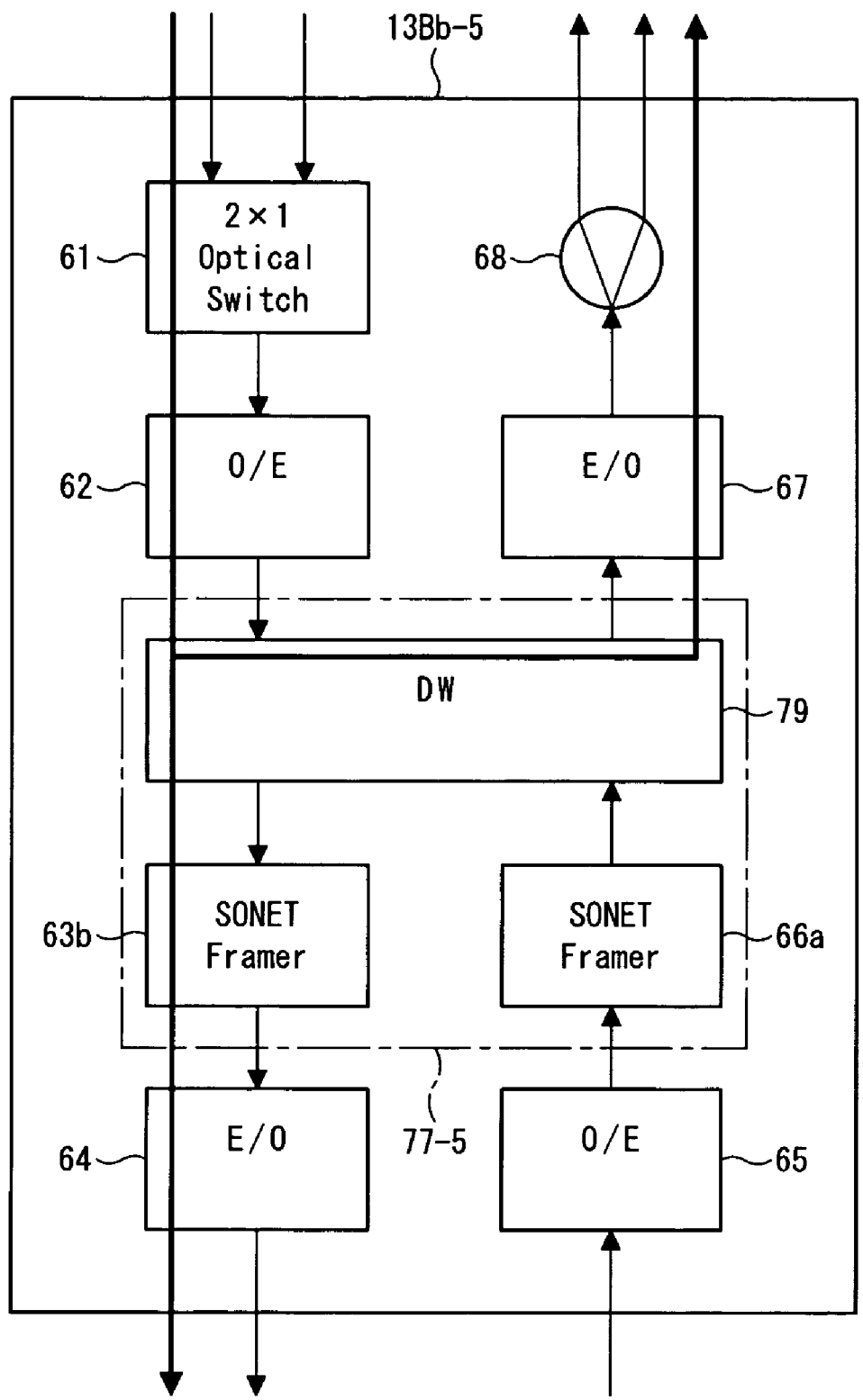
FIG. 15 is a block diagram showing still another modification of the relay transmission apparatus according to the second embodiment of the present invention.

As seen in a transponder unit 13Bb-5 shown in FIG. 15, an electrical stage processing part (dropped/regeneratively relayed electrical signal generation part) 77-5 as described above may be formed by a digital wrapper (DW) 79 and SONET framers 63b and 66a. In this case, the digital wrapper 79 can generate an electrical signal to be dropped in cooperation with the SONET framer 63b and can generate an electrical signal to be regeneratively relayed based on the signal from the first optical-to-electrical conversion part 62.

When the transponder unit 13Bb-4 or 13Bb-5 as shown in FIGS. 14 and 15 is provided, there is no need for providing a dedicated transponder unit for drop-and-continue, and it also can be utilized as a transponder having an add-drop function. Switching can be performed in service between a state of operation in which different signals are communicated upward (add) and downward (drop) and a state of operation in the drop-and-continue mode.

[C] Others

The present invention is not limited to the modes of implementation in the above-described embodiment and may be carried out in various modifications without departing from the gist of the present invention.

For example, the electrical stage processing parts 22A and 32A of the receiving and relaying station 13A shown in FIG. 3 may be configured according to the electrical stage processing parts 77-1 to 77-3 shown in FIGS. 11 to 13. The dropped electrical signal generation parts 22 and 32 and the regeneratively relayed electrical signal generation parts 25 and 35 shown in FIG. 2 may be configured according to the electrical stage processing parts 77-4 and 77-5 shown in FIGS. 14 and 15.

An apparatus according to the present invention can be manufactured according to the above-described embodiments.

What is claimed is:

1. A relay transmission apparatus optically connected to first and second transmission routes that are different from each other, comprising:
    a first regenerating unit adapted to regenerate an optical signal input from the first transmission route and output a regenerated drop signal as a first signal;
    a second regenerating unit adapted to regenerate an optical signal input from the second transmission route and output a regenerated drop signal as a second signal;
    a first branching unit adapted to branch a power of the first signal from the first regenerating unit into two branched first signals;
    a second branching unit adapted to branch a power of the second signal from the second regenerating unit into two branched second signals;
    a first relay transmitting unit adapted to optically transmit one of the branched first signals to the second transmission route;
    a second relay transmitting unit adapted to optically transmit one of the branched second signals to the first transmission route; and
    a protection process unit adapted to selectively output either the other of the branched first signals or the other of the branched second signals as a drop signal, wherein
    the first regenerating unit includes a first optical-to-electrical conversion unit that converts the optical signal from the first transmission route into an electrical signal and a first drop signal generating unit that generates the regenerated drop signal output as the first signal based on the electrical signal from said first optical-to-electrical conversion unit, and
    the second regenerating unit includes a second optical-to-electrical conversion unit that converts the optical signal from the second transmission route into an electrical signal and a second drop signal generating unit that generates the regenerated drop signal output as the second signal based on the electrical signal from said second optical-to-electrical conversion unit.

2. A relay transmission apparatus according to claim 1, wherein:
    each of the first and second branching units has a returning and branching unit for branching and returning part of an optical signal to be dropped from the first and second drop signal generating units, respectively, and each of the first and second relay transmitting units has a regeneratively relayed optical signal generation unit for generating an optical signal to be regeneratively relayed based on the optical signal to be dropped returned by the returning and branching unit; and
    the protection process unit has first and second optical signal component extraction units for extracting optical signals to be dropped from the first and second drop signal generating units of the first and second regenerating units, respectively, and an optical signal selection switch for selecting either of the optical signal components extracted by the first and second optical signal component extraction units as a drop signal.

3. A relay transmission apparatus according to claim 2, wherein:

each of the first and second drop signal generating units of the first and second regenerating units has a first electrical-to-optical conversion unit for converting electrical signals into optical signals as the first and second signals, respectively; and each of the regeneratively relayed optical signal generation units of the first and second relay transmitting units have a second optical-to-electrical conversion unit for converting the optical signal from the returning and branching unit into an electrical signal, a regeneratively relayed electrical signal generation unit for generating an electrical signal to be regeneratively relayed from the electrical signal obtained by the conversion at the second optical-to-electrical conversion unit and a second electrical-to-optical conversion unit for converting the electrical signal to be regeneratively relayed into the optical signal to be regeneratively relayed.

4. A relay transmission apparatus according to claim 2, wherein the returning and branching unit of the first branching unit is commonly used by the first optical signal component extraction unit of the protection process unit, and the returning and branching unit of the second branching unit is commonly used by the second optical signal component extraction unit of the protection process unit as a second optical signal extraction unit.

5. A relay transmission apparatus according to claim 1, wherein:
  each of the first and second regenerating units has an electrical stage processing unit for generating an electrical signal to be dropped and an electrical signal to be regeneratively relayed based on the electrical signals from the first and second optical-to-electrical conversion unit, respectively, and a first electrical-to-optical conversion unit for converting the electrical signals from the electrical stage processing unit into an optical signal to be regeneratively relayed; and
  the protection process unit has an electrical signal selection switch to which the electrical signals to be dropped are input from the electrical stage processing units of the first and second regenerating units, respectively, and which selectively outputs either of the input electrical signals to be dropped as a drop signal, and a second electrical-to-optical conversion unit for converting the electrical signal output by the electrical signal selection switch into an optical signal to be dropped.

6. A relay transmission apparatus according to claim 1, comprising a control unit for controlling the protection process unit such that either of the other of the branched first and second signals from the first and second branching units is selectively output as a drop signal depending on a degree of deterioration of the optical signal input from the first or second transmission route.

7. A relay transmission apparatus optically connected to first and second transmission routes that are different from each other, comprising:
  a protection process unit adapted to selectively output either an optical signal input from the first transmission route or an optical signal input from the second transmission route;
  a signal generation unit adapted to regenerate the optical signal selectively output by the protection process unit and output a regenerated signal;
  a first branching unit adapted to branch the regenerated signal from the signal generation unit into two branched signals, and one of the two branched signals being output as a drop signal whereas the other of the two branched signals being output for relay transmission; and
  a second branching unit adapted to branch the other of the two branched signals from the first branching unit into two further-branched signals so that each of the two further-branched signals is transmitted to the first and second transmission routes, respectively.

8. A relay transmission apparatus according to claim 7, wherein the signal generation unit has:
  a first optical-to-electrical conversion part for converting the optical signal from the protection process unit into a first electrical signal;
  a dropped electrical signal generation part for generating an electrical signal to be dropped from the first electrical signal from the first optical-to-electrical conversion part;
  a first electrical-to-optical conversion part for converting the electrical signal to be dropped generated by the dropped electrical signal generation part into an optical signal to be dropped;
  a returning and branching part for branching and returning a part of the optical signal to be dropped from the first electrical-to-optical conversion part;
  a second optical-to-electrical conversion part for converting the optical signal to be dropped returned by the returning and branching part into a second electrical signal;
  a regeneratively relayed electrical signal generation part for generating an electrical signal to be regeneratively relayed from the second electrical signal from the second optical-to-electrical conversion part; and
  a second electrical-to-optical conversion part for converting the electrical signal to be regeneratively relayed into an optical signal to be regeneratively relayed.

9. A relay transmission apparatus according to claim 7, wherein:
  the signal generation unit has:
    a first optical-to-electrical conversion part for converting the optical signal from the protection process unit into an electrical signal;
    a dropped and regeneratively relayed electrical signal generation part for generating an electrical signal to be dropped and an electrical signal to be regeneratively relayed from the electrical signal from the first optical-to-electrical conversion part;
    a first electrical-to-optical conversion part for converting the electrical signal to be dropped into an optical signal to be dropped; and
    a second electrical-to-optical conversion part for converting the electrical signal to be regeneratively relayed into an optical signal to be regeneratively relayed.

10. A relay transmission apparatus according to claim 7, comprising:
  a first table for managing route information of the optical signal input from the first transmission route and a second table for managing route information of the optical signal input from the second transmission route; and
  a control unit for controlling the protection process unit such that either of the optical signal input from the first transmission route and the optical signal input from the second transmission route is selectively output depending on the route information of the first and second tables and a degree of deterioration of the optical signal input from the first or second transmission route.

* * * * *